(12) United States Patent
Zhao et al.

(10) Patent No.: US 9,338,473 B2
(45) Date of Patent: May 10, 2016

(54) VIDEO CODING

(75) Inventors: David Zhao, Solna (SE); Mattias Nilsson, Sundbyberg (SE); Renat Vafin, Tallinn (EE); Andrei Jefremov, Janfalla (SE); Sören Vang Andersen, Esch-Sur-Alzette (LU); Pontus Carlsson, Bromma (SE)

(73) Assignee: Skype, Dublin (IE)

( * ) Notice: Subject to any disclaimer, the term of this patent is extended or adjusted under 35 U.S.C. 154(b) by 224 days.

(21) Appl. No.: 13/274,881

(22) Filed: Oct. 17, 2011

(65) Prior Publication Data

US 2013/0058405 A1 Mar. 7, 2013

(30) Foreign Application Priority Data

Sep. 2, 2011 (GB) .................................. 1115201.4

(51) Int. Cl.
*H04N 7/12* (2006.01)
*H04N 19/58* (2014.01)
(Continued)

(52) U.S. Cl.
CPC .............. *H04N 19/58* (2014.11); *H04N 19/107* (2014.11); *H04N 19/147* (2014.11); *H04N 19/166* (2014.11); *H04N 19/176* (2014.11); *H04N 19/19* (2014.11); *H04N 19/89* (2014.11)

(58) Field of Classification Search
CPC ......... H04N 11/02; H04N 11/04; H04N 7/18; H04N 7/26; H04N 7/12; H04N 19/194; H04N 19/176; H04N 19/147; H04N 19/103; H04N 19/156; H04N 19/19; H04N 19/65; H04N 19/503; G06K 9/36; H04B 1/66; H04B 15/00; H04L 12/26; G10L 3/02
USPC .......... 375/240.12, E07.243, 240.02, 240.16, 375/240.03, E07.123, 240.2, 240.29, 285, 375/240.27, E07.153
See application file for complete search history.

(56) References Cited

U.S. PATENT DOCUMENTS 5,583,963 A * 12/1996 Lozach ............... G10L 19/0212
704/219
6,097,897 A 8/2000 Ide
(Continued)

FOREIGN PATENT DOCUMENTS

CN 1759610 4/2006
CN 101162930 4/2008
(Continued)

OTHER PUBLICATIONS

"Error Resilient Video Coding via Weighted Distortion" by, Sunday Nyamweno et al., Dept. of EECE, Montreal, CA, 978-1-4244-4291-1109 © 2009 IEEE.*
(Continued)

*Primary Examiner* — Chikaodili E Anyikire
*Assistant Examiner* — Dramos I Kalapodas
(74) *Attorney, Agent, or Firm* — Danielle Johnston-Holmes; Micky Minhas

(57) ABSTRACT

A method of performing a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, wherein the estimate of distortion is based on source coding distortion and an estimate of a distortion that would be experienced due to possible loss over the channel; encoding the target image portion into the encoded video stream using the selected encoding mode; and transmitting the encoded video stream over the channel. The rate-distortion optimization process for a current one of the frames is performed in dependence on feedback received from the receiving terminal based on an earlier one of the frames.

28 Claims, 5 Drawing Sheets

(51) Int. Cl.

| | |
|---|---|
| H04N 19/176 | (2014.01) |
| H04N 19/147 | (2014.01) |
| H04N 19/107 | (2014.01) |
| H04N 19/166 | (2014.01) |
| H04N 19/19 | (2014.01) |
| H04N 19/89 | (2014.01) |
| H04B 15/00 | (2006.01) |
| H04L 12/26 | (2006.01) |

(56) References Cited

U.S. PATENT DOCUMENTS

| | | | |
|---|---|---|---|
| 6,320,919 B1 | 11/2001 | Khayrallah et al. | |
| 6,421,387 B1 | 7/2002 | Rhee | |
| 6,683,988 B1 | 1/2004 | Fukunaga et al. | |
| 7,093,028 B1 | 8/2006 | Shao et al. | |
| 7,142,599 B2 | 11/2006 | Henocq | |
| 7,317,759 B1* | 1/2008 | Turaga et al. | 375/240.01 |
| 7,433,661 B2* | 10/2008 | Kogiantis | H04W 24/00 370/327 |
| 7,733,913 B1 | 6/2010 | Cheung et al. | |
| 8,180,915 B2 | 5/2012 | Zhao | |
| 8,457,202 B2 | 6/2013 | Wang et al. | |
| 8,634,413 B2* | 1/2014 | Lin | H04N 19/00933 370/389 |
| 8,804,836 B2 | 8/2014 | Nilsson et al. | |
| 8,908,761 B2 | 12/2014 | Nilsson et al. | |
| 9,036,699 B2 | 5/2015 | Vafin et al. | |
| 9,131,248 B2 | 9/2015 | Nilsson et al. | |
| 9,143,806 B2 | 9/2015 | Nilsson et al. | |
| 9,307,265 | 4/2016 | Nilsson et al. | |
| 2002/0064228 A1* | 5/2002 | Sethuraman et al. | 375/240.12 |
| 2003/0012202 A1 | 1/2003 | Fukutomi | |
| 2003/0048852 A1 | 3/2003 | Hwang et al. | |
| 2003/0151513 A1 | 8/2003 | Herrmann et al. | |
| 2003/0202579 A1* | 10/2003 | Lin | H04N 19/61 375/240.03 |
| 2004/0114817 A1* | 6/2004 | Jayant et al. | 382/239 |
| 2004/0228537 A1* | 11/2004 | Yeung et al. | 382/239 |
| 2004/0264571 A1 | 12/2004 | Zhang et al. | |
| 2005/0037764 A1 | 2/2005 | Trachtman | |
| 2005/0053299 A1 | 3/2005 | Fuchs et al. | |
| 2005/0135484 A1* | 6/2005 | Lee et al. | 375/240.16 |
| 2005/0213657 A1 | 9/2005 | Kodama et al. | |
| 2005/0237987 A1 | 10/2005 | Wang et al. | |
| 2005/0265383 A1 | 12/2005 | Melpignano et al. | |
| 2006/0056338 A1 | 3/2006 | Abe et al. | |
| 2006/0098573 A1 | 5/2006 | Beer et al. | |
| 2006/0239348 A1 | 10/2006 | Zhang | |
| 2006/0268976 A1* | 11/2006 | Baum et al. | 375/239 |
| 2006/0291558 A1 | 12/2006 | Schreier | |
| 2007/0030894 A1* | 2/2007 | Tian et al. | 375/240.02 |
| 2007/0047650 A1 | 3/2007 | Vilei et al. | |
| 2007/0086527 A1 | 4/2007 | Yan | |
| 2007/0109212 A1 | 5/2007 | Wu et al. | |
| 2007/0160137 A1* | 7/2007 | Guo et al. | 375/240.1 |
| 2007/0206673 A1 | 9/2007 | Cipolli et al. | |
| 2007/0225974 A1 | 9/2007 | Subramaniam et al. | |
| 2007/0285501 A1 | 12/2007 | Yim | |
| 2008/0069201 A1 | 3/2008 | Zhu et al. | |
| 2008/0088743 A1 | 4/2008 | Zhu et al. | |
| 2008/0089414 A1* | 4/2008 | Wang et al. | 375/240.13 |
| 2008/0112481 A1 | 5/2008 | Hsaing et al. | |
| 2008/0188236 A1 | 8/2008 | Alles et al. | |
| 2008/0247469 A1 | 10/2008 | Vadapalli et al. | |
| 2008/0310502 A1* | 12/2008 | Kim et al. | 375/240.02 |
| 2008/0316364 A1* | 12/2008 | Au et al. | 348/608 |
| 2009/0003446 A1* | 1/2009 | Wu et al. | 375/240.16 |
| 2009/0003447 A1* | 1/2009 | Christoffersen | H04N 19/61 375/240.16 |
| 2009/0067495 A1* | 3/2009 | Au et al. | 375/240.12 |
| 2009/0080518 A1* | 3/2009 | Au et al. | 375/240.03 |
| 2009/0086816 A1* | 4/2009 | Leontaris et al. | 375/240.03 |
| 2009/0086827 A1* | 4/2009 | Wu et al. | 375/240.27 |
| 2009/0103635 A1 | 4/2009 | Pahalawatta | |
| 2009/0110062 A1* | 4/2009 | Au et al. | 375/240.03 |
| 2009/0135901 A1* | 5/2009 | Au et al. | 375/240.16 |
| 2009/0158358 A1 | 6/2009 | Yu et al. | |
| 2009/0190661 A1 | 7/2009 | Nagori | |
| 2009/0219991 A1* | 9/2009 | Po et al. | 375/240.02 |
| 2009/0252227 A1 | 10/2009 | NepomucenoLeung et al. | |
| 2010/0042668 A1 | 2/2010 | Liang et al. | |
| 2010/0106431 A1 | 4/2010 | Baba et al. | |
| 2010/0161329 A1 | 6/2010 | Chung et al. | |
| 2010/0215007 A1 | 8/2010 | Zhang et al. | |
| 2010/0226262 A1* | 9/2010 | Liu et al. | 370/252 |
| 2010/0238997 A1* | 9/2010 | Yang et al. | 375/240.03 |
| 2010/0239015 A1 | 9/2010 | Wang et al. | |
| 2010/0278055 A1 | 11/2010 | Barry et al. | |
| 2010/0278275 A1* | 11/2010 | Yang et al. | 375/240.27 |
| 2010/0303148 A1 | 12/2010 | Hiron | |
| 2010/0316126 A1* | 12/2010 | Chen et al. | 375/240.16 |
| 2011/0080952 A1 | 4/2011 | Vadapalli et al. | |
| 2011/0090960 A1 | 4/2011 | Leontaris et al. | |
| 2011/0103480 A1 | 5/2011 | Dane | |
| 2011/0119565 A1 | 5/2011 | Chang et al. | |
| 2011/0150113 A1* | 6/2011 | Oyman et al. | 375/260 |
| 2011/0164677 A1 | 7/2011 | Lu et al. | |
| 2011/0182356 A1 | 7/2011 | Ammu | |
| 2011/0206119 A1 | 8/2011 | Bivolarsky et al. | |
| 2011/0286516 A1* | 11/2011 | Lim et al. | 375/240.03 |
| 2011/0310766 A1 | 12/2011 | Barry et al. | |
| 2012/0039385 A1 | 2/2012 | Yilmaz et al. | |
| 2012/0057471 A1 | 3/2012 | Amini et al. | |
| 2012/0069927 A1* | 3/2012 | Oyman | H04L 1/0019 375/285 |
| 2012/0093017 A1 | 4/2012 | Liu et al. | |
| 2012/0121013 A1 | 5/2012 | Lainema et al. | |
| 2012/0126850 A1 | 5/2012 | Wasson et al. | |
| 2012/0327997 A1 | 12/2012 | Nilsson | |
| 2012/0327998 A1 | 12/2012 | Nilsson | |
| 2012/0328002 A1 | 12/2012 | Vafin | |
| 2013/0007831 A1* | 1/2013 | Wu et al. | 725/116 |
| 2013/0044804 A1 | 2/2013 | Nilsson | |
| 2013/0058394 A1 | 3/2013 | Nilsson | |
| 2013/0058395 A1 | 3/2013 | Nilsson | |
| 2013/0223513 A1* | 8/2013 | Chen | H04N 19/002 375/240.02 |
| 2013/0301660 A1 | 11/2013 | Barry et al. | |
| 2015/0071353 A1* | 3/2015 | Nilsson | H04N 19/503 375/240.12 |

FOREIGN PATENT DOCUMENTS

| | | |
|---|---|---|
| CN | 101346999 | 1/2009 |
| CN | 101960466 | 1/2011 |
| EP | 1439712 | 7/2004 |
| EP | 2096874 | 9/2009 |
| EP | 2139138 | 12/2009 |
| EP | 2184925 | 5/2010 |
| EP | 2230849 | 9/2010 |
| GB | 2167267 | 5/1986 |
| GB | 2492329 | 1/2013 |
| JP | 10145794 | 5/1998 |
| WO | WO-2004004359 | 1/2004 |
| WO | WO-2006042323 | 4/2006 |
| WO | WO-2007015126 | 2/2007 |
| WO | WO-2007084475 | 7/2007 |
| WO | WO-2012171113 | 12/2012 |

OTHER PUBLICATIONS

Scalable Joint Source-Channel Coding for the Scalable Extension of H.264/AVC by Maryse Stoufs, 1051-8215, 2008 IEEE.*

Error-Resilient Video Transmission Using Long-Term Memory Motion Compensated Prediction, by Thomas Wiegand et al., IEEE vol. 18. No. 6. Jun. 2000.*

"Feedback-Based Error Control for Mobile Video Transmission", by Bernd Girod and Niko Farber, 0018-9219/99 IEEE vol. 87 No. 10, Oct. 1999.*

"Joint Source-Channel Rate-Distortion Optimization for H.264 Video Coding Over Error-Prone Networks", by Yuan Zhang et al., 1520-9210, IEEE vol. 9, No. 3, Apr. 2007.*

(56) References Cited

OTHER PUBLICATIONS

"An Error Resilient Scheme for h.264 Video Coding Based on Distortion Extimated Mode Decision and Nearest Neighbor Error Concealment" by Lee Tien-hsu et al., ISSN 1009-3095, University Science A 2006.*
"Scalable Joint Source-Channel Coding for the Scalable Extension of H.264/AVC" by Maryse Stoufs, 1051-8215, 2008 IEEE.*
"A Stochastic Framework for Rate-Distortion Optimized Video Coding Over Error-Prone Networks" by Oztan Harmanci, 1057-7149, 2007 IEEE.*
"Search Report", GB Application No. 1110759.6, (Oct. 18, 2012), 3 pages.
"Search Report", GB Application No. 1110760.4, (Oct. 24, 2012), 4 pages.
"Search Report", GB Application No. 1110763.8, (Oct. 18, 2012), 3 pages.
"Search Report", GB Application No. 1114323.7, (Dec. 10, 2012), 3 pages.
"Search Report", GB Application No. 1115201.4, (Feb. 12, 2013), 3 pages.
"Search Report", GB Application No. 1115209.7, (Feb. 12, 2013), 3 pages.
"International Search Report and Written Opinion", Application No. PCT/US2012/053581, (Dec. 11, 2012),14 pages.
"International Search Report and Written Opinion", Application No. PCT/US2012/053850, (Dec. 5, 2012),12 pages.
"International Search Report and Written Opinion", Application No. PCT/US2012/053583, (Dec. 5, 2012),13 pages.
"International Search Report and Written Opinion", Application No. PCT/US2012/051507, (Dec. 17, 2012),13 pages.
Alwihaibi, Abdullah et al., "Computation of the Residual Packet Loss Probability in a Binary Multicast Tree", (2003), 4 pages.
Chen, Chih-Ming "Error Resilience Transcoding Using Prioritized Intra-Refresh for Video Multicast Over Wireless Networks", (2005), 4 pages.
Naghdinezhad, Amir et al., "Distortion Estimation for Reference Frame Modification Methods", *19th European Signal Processing Conference (EUSIPCO 2011)*, (2011), 5 pages.
Stockhammer, Thomas et al., "Rate-Distortion Optimization for JVT/H.26L Video Coding in Packet Loss Environment", *International Workshop on Packet Video, 2002*, (Apr. 24, 2002),12 pages.
Vadapalli, Sarat C., "Low-Complexity Frame-Level Joint Source-Channel Distortion Optimal, Adaptive Intra Refresh", *2008 IEEE 10th Workshop on Multimedia Signal Processing*, (2008), pp. 474-480.
Vadapalli, Sarat C., et al., "Efficient Alternative to Intra Refresh Using Reliable Reference Frames", *International Conference on Multimedia and Expo, 2007 IEEE*, (2007), 4 pages.
Zhang, Yuan et al., "Joint Source-Channel Rate-Distortion Optimization for H.264 Video Coding Over Error-Prone Networks", (2007), pp. 445-454.
Zhang, Yuan et al., "Optimum End-to-End Distortion Estimation for Error Resilient Video Coding", (2004), 4 pages.
"International Search Report and Written Opinion", Application No. PCT/EP2012/062163, (Aug. 7, 2012), 15 pages.
"International Search Report and Written Opinion", Application No. PCT/EP2012/062164, (Jul. 30, 2012), 14 pages.
"International Search Report and Written Opinion", Application No. PCT/EP2012/062162, (Aug. 7, 2012), 17 pages.
Chao, Yi-Chin et al., "An Approximate Square Criterion for H.264/ AVC Intra Mode Decision", *Multimedia and Expo. 2888 IEEE International Conference on. IEEE*. Piscataway. NJ. USA, (Jun. 23, 2008), pp. 333-336.
Chen, Quqing et al., "Attention-Based Adaptive Intra Refresh for Error-Prone Video Transmission", *video transmission, IEEE Communications Magazine, IEEE Service Center*, Piscataway, US, vo 1 . 44, No. 1, (Jan. 1, 2007), pp. 52-60.
Lim, Keng-Pang et al., "JM text: Description of Joint Model Reference Encoding Methods and Decoding Concealment Methods", *24.*
*JVT Meeting; 81. MPEG. Meeting; 29.6.2887-5.7.2886*; Geneva. CH;*(Joint Video Team of ISO/IEC JTC1/SC29/WG11 and ITU-T SG . 16*, (Jul. 3, 2007), 58 pages.
Liu, Meng et al., "Rate Control Based on Intermediate Description", *Visual Communications and Image Processing*; Jul. 11, 2010-Jul. 14, 2010; Huang Shan, An Hu I , China, (Jul. 11, 2012), 10 pages.
Nyamweno, S et al., "Error Resilient Video Coding Via Weighted Distortion", *Multimedia and Expo, 2009. ICME 2009. IEEE International Conference on, IEEE*, Piscataway, NJ, USA, (Jun. 28, 2009), pp. 734-737.
Rolin, Ruan "A Novel Intra Refreshment Algorithm for ROI", *Multimedia and Information Technology, 2008. MMIT '08. International Conference on, IEEE*, Piscataway, NJ, USA, (Dec. 30, 2008), pp. 62-65.
Sarwer, Mohammed G., et al., "Enhanced Low Complex Cost Function for H.264/AVC Intra Mode Decision", *Multimedia and Signal Processing (CMSP). 2811 International Conference on. IEEE*, (May 14, 2011), pp. 46-50.
Song, Mingzhou et al., "Motion Estimation in DCT Domain", *IEEE*, vol. 5, (1996),pp. 670-674.
Sullivan, Gary J., et al., "Rate-Distortion Optimization for Video Compression", *IEEE Signal Processing Magazine*, 15(6), (Nov. 1, 1998), pp. 74-90.
Wang, Yi et al., "Off-Line Motion Description for Fast Video Stream Generation in MPEG-4 AVC/H.264", *2006 International Conference on Multimedia and Expo (ICME 2006)*, Toronto, Ont., Canada, *IEEE*, Piscataway, NJ, USA, (Jul. 1, 2006), pp. 685-688.
Wiegand, Thomas et al., "Error Resilient Video Transmission Using Long-Term Memory Motion-Compensated Prediction", *IEEE Journal on Selected Areas in Communications, IEEE Service Center*, Piscataway, US, val. 18, No. 6, (Jun. 1, 2000), pp. 1050-1062.
Xiong, Bing et al., "A New Multiplication-Free Block Matching Criterion", *IEEE Transactios on Circuits and Systems for Video Technology. IEEE Service Center*. Piscataway. NJ. US. vo 1. No. 18, (Oct. 1, 2008), pp. 1441-1446.
Zhang, Yuan et al., "Error Resilience Video Coding in H.264 Encoder with Potential Image Processing", *Image Processing, 2004. ICIP '04. 2004 International Conference on Singapore* Oct. 24-27, 2004, Piscataway, NJ, USA,*IEEE*, val. 1, (Oct. 24, 2004), pp. 163-166.
"Non-Final Office Action", U.S. Appl. No. 13/274,739, Nov. 20, 2013, 14 pages.
"Non-Final Office Action", U.S. Appl. No. 13/274,922, Jan. 16, 2014, 18 pages.
"Non-Final Office Action", U.S. Appl. No. 13/275,046, Jan. 16, 2014, 21 pages.
"Non-Final Office Action", U.S. Appl. No. 13/274,865, Jan. 7, 2014, 24 pages.
"Non-Final Office Action", U.S. Appl. No. 13/274,904, Nov. 12, 2013, 25 pages.
"Notice of Allowance", U.S. Appl. No. 13/274,739, Jan. 9, 2014, 4 pages.
"Final Office Action", U.S. Appl. No. 13/274,865, Jul. 18, 2014, 24 pages.
"Final Office Action", U.S. Appl. No. 13/274,922, Jul. 16, 2014, 23 pages.
"Final Office Action", U.S. Appl. No. 13/275,046, May 22, 2014, 22 pages.
"Non-Final Office Action", U.S. Appl. No. 13/274,904, Jun. 16, 2014, 32 pages.
"Notice of Allowance", U.S. Appl. No. 13/274,803, Jul. 30, 2014, 15 pages.
"Foreign Office Action", CN Application No. 201210320556.X, Nov. 3, 2014, 13 pages.
"Foreign Office Action", CN Application No. 201210320553.6, Sep. 15, 2014, 16 pages.
"Non-Final Office Action", U.S. Appl. No. 13/275,046, Dec. 9, 2014, 28 pages.
Wiegand, et al., "Rate-Distortion Optimized Mode Selection for Very Low Bit Rate Video Coding and the Emerging H.263 Standard", IEEE Transactions on Circuits and Systems for Video Technology, vol. 6, No. 2., Apr. 1996, pp. 182-190.
"Foreign Office Action", CN Application No. 20120320325.9, Oct. 10, 2014, 18 pages.

(56) References Cited

OTHER PUBLICATIONS

"Notice of Allowance", U.S. Appl. No. 13/274,904, Dec. 22, 2014, 6 pages.

"Notice of Allowance", U.S. Appl. No. 13/274,922, Apr. 13, 2015, 11 pages.

"Notice of Allowance", U.S. Appl. No. 13/275,046, May 8, 2015, 7 pages.

"Non-Final Office Action", U.S. Appl. No. 13/274,865, Jun. 18, 2015, 27 pages.

"Foreign Office Action", CN Application No. 201210320325.9, Jun. 15, 2015, 7 pages.

"Foreign Office Action", CN Application No. 201210320553.6, Jul. 17, 2015, 7 pages.

"Second Office Action Received for China Patent Application No. 201210320556.X", Mailed Date: Sep. 25, 2015, 7 pages.

"Notice of Allowance Issued in U.S. Appl. No. 14/543,057" Mailed Date: Oct. 22, 2015, 6 pages.

"Final Office Action", U.S. Appl. No. 13/274,865, (Jan. 21, 2016), 28 pages.

"Foreign Office Action", CN Application No. 201210320553.6, (Jan. 25, 2016), 7 pages.

* cited by examiner

VIDEO CODING

RELATED APPLICATION

This application claims priority under 35 U.S.C. §119 or 365 to Great Britain Application No. GB 1115201.4, filed Sep. 2, 2011. The entire teachings of the above application are incorporated herein by reference.

TECHNICAL FIELD

The present invention relates to balancing a trade-off between bitrate and distortion when selecting an encoding mode for encoding portions of a video signal.

BACKGROUND

A stream of video data to be encoded is illustrated schematically in FIG. 1a. The stream comprises multiple frames (F) each representing the video image at a different respective moment in time. As will be familiar to a person skilled in the art, for the purpose of encoding, each frame (F) is divided into portions and each portion may also be subdivided into smaller sub-portions, each portion or sub-portion comprising a plurality of pixels. For example, according to one terminology each frame of a video stream to be encoded is divided into macroblocks (MB) and each macroblock is sub-divided into blocks or subblocks (b), each block or subblock comprising multiple pixels. Each frame may also be divided into independently decodable slices (S), each slice comprising one or more macroblocks. N.B. the divisions shown in FIG. 1a are only schematic for illustrative purposes and it will be appreciated that these are not necessarily meant to correspond to any actual encoding scheme—e.g. each frame is likely to contain a larger number of macroblocks.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction can typically be performed from pixels in video frames other than the current frame (inter prediction) and from pixels in the same frame (intra prediction). That is, if encoded using intra frame encoding then a block, subblock or other portion of the frame (the target block or portion) is encoded relative to another block, subblock or image portion in the same frame (the reference block or portion); and if encoded using inter frame encoding then the target block or portion is encoded relative to a reference block or portion in another frame. This process is commonly referred to as prediction or prediction coding. The inter or intra prediction module will thus generate a prediction, e.g. in the form of an indication of a neighboring block or subblock in the case of intra frame encoding and/or a motion vector in the case of inter frame encoding. Typically the encoder also generates a residual signal representing a "left over" difference between the predicted block and the actual block (or predicted and actual subblocks, etc.). The residual, motion vectors and any required data associated with the intra prediction are then output into the encoded video stream, typically via further coding stages such as a quantizer and entropy encoder. Hence most blocks in the video can be encoded in terms of a difference between blocks, which requires fewer bits to encode than encoding absolute pixel values and hence saves on bitrate. Intra prediction encoding typically requires more bits than inter prediction, though still represents a saving over encoding absolute values. Details of suitable inter and intra encoding techniques for video will be familiar to a person skilled in the art.

Modern codecs allow the use of different prediction encoding modes for different portions within a frame. The possibility of having different coding options increases the rate-distortion efficiency of a video codec. The optimal coding representation has to be found for every frame region. Typically, such region is a macroblock, e.g. of 16×16 pixels. I.e. so it is possible for an intra prediction or inter prediction mode to be selected individually for each macroblock, so that different macroblocks within the same frame can be encoded with different modes. It is also possible in some codecs to use different modes based on different levels of partitioning of macroblocks, e.g. selecting between a higher complexity mode in which a separate prediction is performed for each 4×4 subblock within a macroblock or a lower complexity mode in which prediction is performed based on only 8×8 or 8×16 blocks or even whole macroblocks. The available modes may also include different options for performing prediction. For example as illustrated schematically in FIG. 1b, in one intra mode the pixels of a 4×4 subblock (b) may be determined by extrapolating down from the neighboring pixels from the subblock immediately above, or by extrapolating sideways from the subblock immediately to the left. Another special prediction mode called "skip mode" may also be provided in some codecs, which may be considered as an alternative type of inter mode. In skip mode (PSkip) the target's motion vector is inferred based on the motion vectors to the top and to the left and there is no encoding of residual coefficients. The manner in which the motion vector is inferred is consistent with motion vector prediction, thus the motion vector difference is zero and so it is only required to signal that the macroblock is a skip block.

A coding representation may thus include block partition information, prediction mode, motion vector, quantization accuracy, etc. The optimal coding option depends on video content, bit rate, earlier coding decisions, etc. The accuracy of quantization of transform coefficients is typically chosen to meet a bit rate constraint. Furthermore, distortion should be minimized.

For example, the H.264 video coder provides a great flexibility in choosing the prediction mode. For inter prediction of the luma component, a macroblock of 16×16 pixels can be represented as one block of 16×16 pixels, or two blocks of 16×8 pixels, or two blocks of 8×16 pixels, or four blocks of 8×8 pixels. Further, an 8×8 block can be represented as one block of 8×8 pixels, or two subblocks of 8×4 pixels, or two subblocks 4×8 pixels, or four subblocks of 4×4 pixels. The inter prediction is tried for each allowed partition of a macroblock. The inter prediction of a block is represented by indexing the reference frame(s) and the motion vector(s) (spatial shift from the reference block in the respective reference frame), which typically are estimated with sub-pixel precision. For intra prediction of the luma component, there are four possible modes for 16×16 blocks and nine possible modes for 4×4 subblocks. Further, there are four possible modes for chroma components. The best prediction mode is chosen by comparing the performance of inter and intra prediction modes.

The rate-distortion performance of a video codec such as H.264 AVC depends to a large extent on the performance of the macroblock mode selection o. That is, the procedure of determining whether the macroblock is best encoded, in terms of rate-distortion trade-offs, using e.g. intra mode or inter mode. From a robustness perspective, intra coded macroblocks are beneficial since they stop temporal error propagation (assuming the use of constrained intra prediction, i.e. intra prediction from inter predicted macroblocks is prohibited). However, intra coded macroblocks are generally more expensive in terms of rate compared to inter coded macroblocks, and thus it is important to introduce intra coded macroblocks systematically such that the distortion (e.g. average distortion) at the decoder is minimized given a certain bit budget and channel condition Zhang et al., "Error resilience video coding in H.264 encoder with potential distortion tracking", (Proc. IEEE International Conference on Image Processing, pp. 163-166, 2004) (incorporated herein in its entirety) propose such a systematic framework to introduce intra coded macroblocks based on the minimization of the expected average sum of squared differences (SSD) at the decoder. By tracking the potential distortion Zhang et al. are able to compute a bias term related to the expected error-propagation distortion (at the decoder) that is added to the source coding distortion when computing the cost for inter macroblocks within the encoder rate-distortion loop.

The rate-distortion performance optimization problem can be formulated in terms of minimizing distortion under a bit rate constraint R. A Lagrangian optimization framework is often used to solve the problem, according to which the optimization criterion may be formulated as:

$$J = D(m,o) + \lambda R(m,o), \quad (1)$$

where J represents the Lagrange function, D represents a measure of distortion (a function of mode o and macroblock m or macroblock sub-partition), R is the bitrate, and λ is a parameter defining a trade-off between distortion and rate. Commonly used distortion measures are sum of squared differences (SSD) between original and reconstructed pixels or sum of absolute differences (SAD) between the original and predicted pixels.

In this application solving the Lagrangian optimization problem means finding the encoding mode o which minimizes the Lagrange function J, where the Lagrange function J comprises at least a term representing distortion, a term representing bitrate, and a factor (the "Lagrange multiplier") representing a tradeoff between the two. As the encoding mode o is varied towards more thorough or better quality encoding modes then the distortion term D will decrease. However, at the same time the rate term R will increase, and at a certain point dependent on λ the increase in R will outweigh the decrease in D. Hence the expression J will have some minimum value, and the encoding mode o at which this occurs is considered the optimal encoding mode.

In this sense the bitrate R, or rather the term λR, places a constraint on the optimization in that this term pulls the optimal encoding mode back from ever increasing quality. The mode at which this optimal balance is found will depend on λ, and hence λ may be considered to represent a tradeoff between bitrate and distortion.

The Lagrangian optimization is commonly used in the process of choosing coding decisions, and is applied for every frame region (e.g. every macroblock of 16×16 pixels). Commonly, the distortion may be evaluated to account for all processing stages. These include prediction, transform, and quantization. Furthermore, in order to compute reconstructed pixels, steps of inverse quantization, inverse transform, and inverse prediction must be performed. SSD is often preferred as distortion criterion since it results in higher quality compared to SAD. Commonly, the rate also accounts for coding of all needed parameters, including parameters describing prediction and quantized transform coefficients.

In Zhang et al., the authors estimate the potential distortion in the decoder due not only to source coding but also to channel errors, i.e. also a likely distortion that would be experienced due to loss of data when the signal is transmitted over the channel. The estimated potential distortion is then indirectly used to bias the mode selection towards intra coding (if there is a probability of channel errors).

Zhang's "end-to-end" distortion expression is based on the sum of squared differences (SSD) distortion measure and assumes a Bernoulli distribution for losing macroblocks.

The optimal macroblock mode $o_{opt}$ is given by:

$$o_{opt} = \underset{o}{\mathrm{argmin}}(D_s(m, o) + D_{ep\_ref}(m, o) + \lambda R(m, o)), \quad (2)$$

where $D_s(m, o)$ denotes the SSD distortion between the original and reconstructed pixels for macroblock m and macroblock mode o, R the total rate, and λ the Lagrange multiplier relating the distortion and the rate term. $D_{ep\_ref}(m, o)$ denotes the expected distortion within the reference macroblock in the decoder due to error propagation. $D_{ep\_ref}(m, o)$ thus provides a bias term which bias the optimization toward intra coding if error propagation distortion becomes too large. $D_{ep\_ref}(m, o)$ is zero for the intra coded macroblock modes. The expression $D_s(m, o) + D_{ep\_ref}(m, o) + \lambda R(m, o)$ may be considered an instance of a Lagrange function J. Argmin$_o$ outputs the value of the argument o for which the value of the expression J is minimum.

In Zhang et al. the term $D_{ep\_ref}(m, o)$ follows the motion of the objects and is calculated from a total distortion map using the current motion vectors. The total expected error propagation distortion map $D_{ep}$ is driven by the performance of the error concealment and is updated after each macroblock mode selection as:

$$D_{ep}(m(k),n+1) = (1-p)D_{ep\_ref}(m(k),n,o_{opt}) + p(D_{ec-rec}(m(k),n,o_{opt}) + D_{ec-ep}(m(k),n)), \quad (3)$$

where n is the frame number, m(k) denotes the $k^{th}$ sub-partition (i.e. block or subblock) of macroblock m, p the probability of packet loss, $D_{ec-rec}$ denotes the SSD between the reconstructed and error concealed pixels in the encoder, and $D_{ec-ep}$ the expected SSD between the error concealed pixels in the encoder and decoder.

In Zhang et al. $D_{ep}$ is stored on a 4×4 grid over each macroblock of the frame, i.e. 16 values of $D_{ep}$ per macroblock, so one value of $D_{ep}$ per 4×4 pixel subblock of each macroblock. As shown in FIG. 1c, the computation of $D_{ep\_ref}(m(k),o)$, i.e. the expected error-propagation reference distortion for a subblock k within the macroblock m of frame at time n, is then performed as a weighted sum of the values of $D_{ep}$ from four subblocks from a preceding frame from time n−1. The weights are determined from the motion vector for the block m in question. That is:

$$D_{ep\_ref}(m(k), n) = \sum_{i=1}^{4} w_i D_{ep}(q_i(k_i), n-1), \quad (4)$$

where the weights $w_i$ are proportional to the area of overlap and where $q_i(k_i)$ denotes subblock $k_i$ macroblock $q_i$ in a preceding frame n−1.

FIG. 1c provides an illustration of the computation of the expected error-propagation reference distortion from a motion vector and an expected error-propagation distortion map, with reference to exemplary subblocks b1 ... b4 (in this example k corresponds to b1 and i counts through b1 ... b4).

SUMMARY

The process of Zhang et al. is based only on a priori probabilistic assumptions made purely at the encoder about the likelihood of loss over the channel.

However, some existing communication systems provide a feedback mechanism for the purpose of reporting certain information back from the receiver to the transmitter, and/or for control purposes. For example the encoder may receive back information about what frames arrived correctly at the decoder and/or what frames that were lost in the transmission, and in response may generate an intra frame to break error propagation. However the existing mechanism is simplistic in that it only triggers the generation of a whole intra frame, and also does not incorporate any probabilistic estimate of distortion that is likely to be experienced due to loss of other frames or parts of frames that are yet to be either acknowledged or reported lost.

The algorithm by Zhang et al. considers only the scenario of transmitting video over an erroneous channel without considering the possible use or availability of any feedback, and as such the process of Zhang et al. is not based on any actual a posteriori knowledge of the channel.

Viewed from the other perspective, the conventional use of the feedback only triggers generation of a whole intra frame, and there is no mode selection at a level of individual portions within a frame (e.g. macroblock by macroblock). Also, the conventional use of feedback does not involve an estimate of a distortion that would be experienced due to possible loss over the channel.

The inventors on the other hand propose to make use of information being fed back from the decoder to the encoder, e.g. the packet and/or frame arrival status, to further adapt the loss-adaptive rate-distortion optimization process in the encoder and thereby improve the overall rate-distortion performance compared to the method by Zhang et al.

A first embodiment of the present invention may make use of a system of short- and long-term references. For example, the H.264 AVC standard supports a functionality of marking certain reference frames as so-called "long-term" references. These long-term references remain in the decoded picture buffer until explicitly removed. This is in contrast to the "short-term" reference frames where a new short-term reference overwrites the oldest short-term reference frame in the decoded picture buffer.

According to the first embodiment of the present invention, the feedback mechanism can be used to make the encoder aware of what is the latest acknowledged long-term reference available at the decoder (in addition to information about which frames have been lost). In the following, an acknowledged reference preferably means an acknowledged error-free reference (i.e. a reference without any error-propagation distortion), rather than just a reference that is acknowledged in itself. That is, the references should preferably be acknowledged according to a strict definition that the reference is acknowledged as received and everything relevant in that reference's history was also acknowledged as received, so that it can be known there is no error propagation; as opposed to it just being acknowledged that the current reference is received without strict acknowledgement of its history. Note that a portion in a frame that is only acknowledged in itself, but which is encoded relative to error-free blocks, is also error-free (no propagation error).

Inter prediction based on acknowledged long-term reference frames can be used to stop error propagation in the decoder, similar to intra coding. The benefit of using inter prediction from a long-term reference is that inter prediction generally results in a lower bitrate for a given distortion level.

By utilizing the acknowledged long-term references for inter prediction, this first embodiment of the present invention makes available an additional macroblock coding mode, to be used for example in the framework of Zhang et al., that can stop error propagation similar to intra coding, but in general at a lower associated bitrate.

The algorithm by Zhang et al. considers only two different types of coding mode, intra and inter coding. In that case the error-propagation reference distortion $D_{ep-ref}(m, o)$ in equation (3) is zero only for intra coded macroblock modes. However, the first embodiment of the present invention augments the set of available coding modes to include inter coding from acknowledged long-term references. $D_{ep-ref}(m, o)$ is then set to zero not only for intra coding but also for inter coding from acknowledged references. The advantage of such a coding mode is that it can stop the error propagation in a similar manner to intra coding, but at a lower bitrate in general.

A variant of the first embodiment of the present invention uses the idea that, for a certain reference (e.g. long-term reference) for which no feedback has yet be received, this reference nonetheless has a certain probability of becoming an error-free acknowledged reference based on intermediate reports from the decoder. For example, yet another available encoding mode may be introduced which distinguishes the use of inter prediction based on a non-acknowledged long-term reference from the use of inter prediction based on a non-acknowledged short term reference. For the non-acknowledged long-term reference, the estimate of error propagation distortion $D_{ep-ref}(m, o)$ is reduced in dependence on the a priori estimate of the probability of loss (i.e. p is not in itself based on feedback), and based on the time (or equivalently number of frames) since the last (most recent) acknowledged long-term reference in the non-acknowledged reference's history.

In another variant of the first embodiment, when the round-trip time (RTT) for a packet is sufficiently low compared to the number of short-term references in the decoded picture buffer (the round-trip time is the time for a packet to travel from the transmitter to the receiver and back again), then the same concept may apply to short-term references. That is, for a sufficiently small RTT, an alternative or additional possibility is to recognize short-term references as being acknowledged, which can then be used in a similar way to the acknowledged long-term references discussed above. Again, the required algorithmic change to equation (3) is that $D_{ep-ref}(m, o)$ is set to zero not only for intra coding but also for inter coding from acknowledged references.

Also, note that the acknowledgements need not be on a whole-frame basis. It may instead be arranged to receive acknowledgements for only parts of frames, e.g. slices, and treat those different parts differently in dependence on the acknowledgement or lack thereof (or explicit report of non receipt).

In a second embodiment of the present invention, information fed back from the decoder to the encoder such as the packet and/or frame arrival status is used to adjust the potential distortion maps in the encoder, and thereby improve the overall rate-distortion performance compared to the method by Zhang et al.

According to the second embodiment, the potential error propagation distortion maps are stored in association with each frame or slice in the decoded picture buffer of the encoder (together with error concealment reconstruction distortion maps, error concealment error propagation maps, corresponding mode decisions and motion vector information). This second embodiment then utilizes the feedback information from the decoder to update the potential distortion maps. The feedback information facilitates refined potential distortion tracking, yielding better rate-distortion performance.

If the encoder receives feedback information signaling that a particular frame has arrived at the decoder, the error concealment contributions can be removed from the error propagation distortion map in equation (3). Conversely, if feedback information is received signaling that a particular frame or slice was lost at the decoder, the associated error propagation distortion map is recomputed so as to only include the contributions from the error concealment distortion, i.e. the second and third term in the right hand side of equation (3) (normalized with p).

Then, if the round trip time (RTT) is small in comparison to the number of reference pictures in the decoded picture buffer, it is possible to propagate the adjusted potential error-propagation map at time n-RTT to the error propagation distortion map at time n−1 using equation (3) recursively. The updated error propagation distortion map at time n−1 will then be the basis for the computation of the $D_{ep\_ref}$ at time n which is used in the mode selection process (2). This results in a more accurate tracking of the potential distortion maps, and thus, improves the overall rate-distortion performance of the system.

The above outlines some particular exemplary embodiments, but more generally the present invention provides a system, computer program product and apparatus in line with the following.

According to one aspect of the present invention there is provided a method of encoding a video stream at an encoder of a transmitting terminal for transmission over a lossy channel to a decoder at a receiving terminal, the method comprising: performing a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, wherein the estimate of distortion is based on source coding distortion and an estimate of a distortion that would be experienced due to possible loss over the channel; encoding the target image portion into the encoded video stream using the selected encoding mode; and transmitting the encoded video stream over the channel; wherein the rate-distortion optimization process for a current one of said frames is performed in dependence on feedback received from the receiving terminal based on an earlier one of said frames.

Said feedback may comprise one of: an acknowledgement that at least part of said earlier frame has been received, and a report that at least part of said earlier frame has not been received.

In the first embodiment of the present invention, the set of encoding modes may include an acknowledged reference inter prediction mode which encodes the target image portion relative to a corresponding reference portion in the acknowledged earlier frame or acknowledged part of the earlier frame.

The acknowledged reference inter prediction mode may be available for use in the encoding mode selection on condition that the reference portion is acknowledged as received and anything relative to which the reference portion was encoded has also been acknowledged as received, such that the reference portion may be known to incur no error propagation.

The performance of the loss-adaptive rate-distortion optimization process in dependence on said feedback may comprise: setting the estimate of distortion due to loss to nothing on condition that the feedback comprising said acknowledgement is received.

The method may comprise: running an encoder-side instance of the decoder at the encoder, and maintaining at the encoder a decoded picture buffer storing short and long term references in the form of reference image data reconstructed by the encoder-side instance of the decoder, wherein the short-term references may be overwritten automatically by successive frames, whereas the long term references may be removed based on condition of an explicit removal command; and wherein the acknowledged reference inter prediction mode may encode the target image portion relative to a corresponding one of the long-term references in the decoded picture buffer acknowledged to have been received at the receiving terminal.

The set of encoding modes may comprise at least an intra frame mode, at least one non-acknowledged inter frame encoding mode, and said acknowledged inter prediction mode.

The set of encoding modes may include a non-acknowledged long-term reference inter prediction mode which encodes the target image portion relative to a corresponding long-term reference in an unacknowledged frame or part of a frame stored in the decoded picture buffer; wherein the performance of the loss-adaptive rate-distortion optimization process in dependence on said feedback may comprise: determining the estimate of distortion due to loss in dependence on an estimated probability of loss and a time since a last acknowledged earlier frame or acknowledged part of an earlier frame.

The set of encoding modes may also comprise a non-acknowledged short-term reference inter prediction mode.

The method may comprise running an encoder-side instance of the decoder at the encoder, and maintaining at the encoder a decoded picture buffer storing short and long term references in the form of reference image data reconstructed by the encoder-side instance of the decoder, wherein the short-term references may be overwritten automatically by successive frames, whereas the long term references may be removed based on condition of an explicit removal command; and wherein the acknowledged reference inter prediction mode may encode the target image portion relative to a corresponding short-term reference in the decoded picture buffer acknowledged to have been received at the receiving terminal.

The set of encoding modes may include an unconstrained intra encoding mode which allows intra encoding of a target image portion from an inter encoded reference portion.

In the second embodiment of the present invention, the performance of the loss-adaptive rate-distortion optimization process in dependence on said feedback may comprise: adjusting the estimate of distortion for the earlier frame or part of the earlier frame in dependence on said feedback, and propagating the adjusted estimate of distortion forward for use in relation to the current frame.

The performance of the loss-adaptive rate-distortion optimization process in dependence on said feedback may comprise: adjusting the estimate of distortion for the earlier frame or part of the earlier frame in dependence on at least one of said acknowledgment and said report, and propagating the adjusted estimate of distortion forward for use in relation to the current frame.

The estimate of distortion that would be experienced due to possible loss may be based on a first contribution representing an estimate of the distortion that would be experienced, if the target portion does arrive over the channel, due to non arrival of a reference portion in the target portion's history from which prediction of the target portion depends, and on a second contribution representing an estimate of distortion that would be experienced due to concealment.

The second contribution may comprise a contribution representing a measure of concealment distortion of the target portion relative to an image portion that would be used to conceal loss of the target portion if the target portion is lost over the channel, and a contribution representing an estimate of distortion that would be experienced due to loss of an image portion in the target portion's history upon which concealment of the target portion depends.

The performance of the loss-adaptive rate-distortion optimization process in dependence on said feedback may comprise one or both of: setting the second contribution to nothing for the earlier frame on condition that the feedback comprising said acknowledgement is received, and setting the first contribution to nothing to nothing for the earlier frame on condition that the feedback comprising said report of non-receipt is received.

According to another aspect of the present invention, there is provided a transmitting terminal for encoding a video stream for transmission over a lossy channel to a decoder at a receiving terminal, the transmitting terminal comprising: an encoder configured to perform a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, wherein the estimate of distortion is based on source coding distortion and an estimate of a distortion that would be experienced due to possible loss over the channel, the encoder being arranged to encode the target image portion into the encoded video stream using the selected encoding mode; and a transmitter arranged to transmit the encoded video stream over the channel; wherein the encoder is configured such that the rate-distortion optimization process for a current one of said frames is performed in dependence on feedback received from the receiving terminal based on an earlier one of said frames.

In embodiments the encoder may be further configured to perform operations in accordance with any of the above method features.

According to another aspect of the present invention, there is provided a computer program product for encoding a video stream at a transmitting terminal for transmission over a lossy channel to a decoder at a receiving terminal, the computer program product being embodied on a non-transitory computer-readable medium and comprising code configured so as when executed on the transmitting terminal to perform operations of: performing a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, wherein the estimate of distortion is based on source coding distortion and an estimate of a distortion that would be experienced due to possible loss over the channel; encoding the target image portion into the encoded video stream using the selected encoding mode; and transmitting the encoded video stream over the channel; wherein the rate-distortion optimization process for a current one of said frames is performed in dependence on feedback received from the receiving terminal based on an earlier one of said frames.

In embodiments the code may be further configured so as when executed to perform operations in accordance with any of the above method features.

The invention may be particularly (but not exclusively) applicable when encoding a video stream in real-time, i.e. a live video stream such as that of a video call, where the encoder has to dynamically encode the stream for transmission as-and-when it is received from the camera or such like.

BRIEF DESCRIPTION OF THE DRAWINGS

For a better understanding of the present invention and to show how it may be put into effect, reference is made by way of example to the accompanying drawings in which.

DETAILED DESCRIPTION

Figure 2:
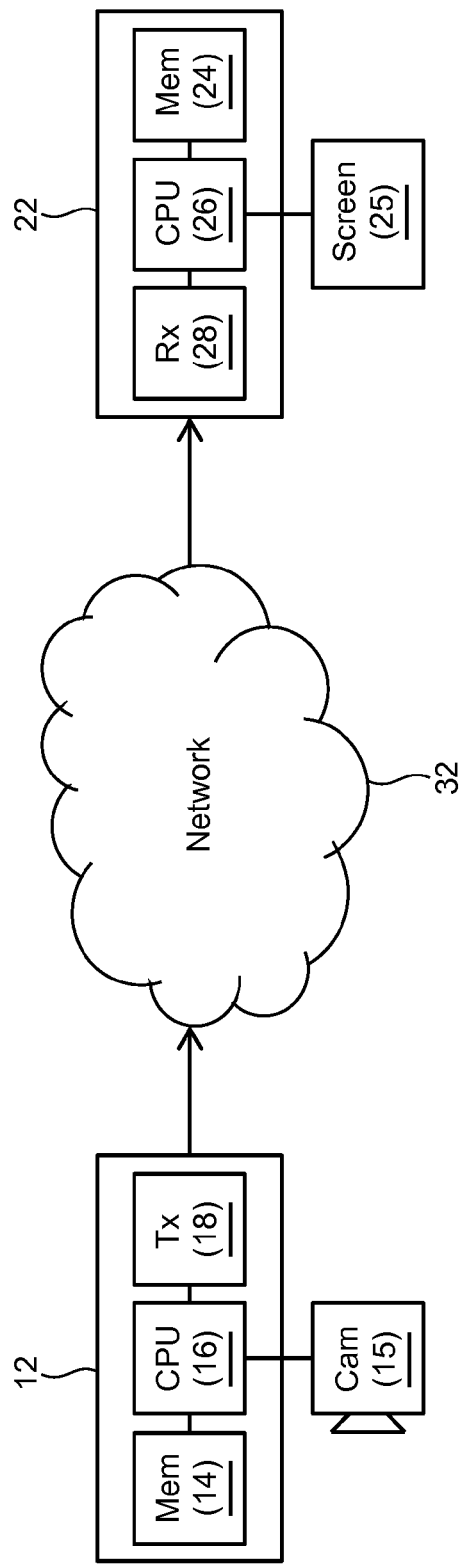
FIG. 2 is a schematic block diagram of a communication system.

An example communication system in which video coding may be employed is illustrated schematically in the block diagram of FIG. 2. The communication system comprises a first, transmitting terminal 12 and a second, receiving terminal 22. For example, each terminal 12, 22 may comprise a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a storage medium 14 such as a flash memory or other electronic memory, a magnetic storage device, and/or an optical storage device. The first terminal 12 also comprises a processing apparatus 16 in the form of a CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

Figure 3:
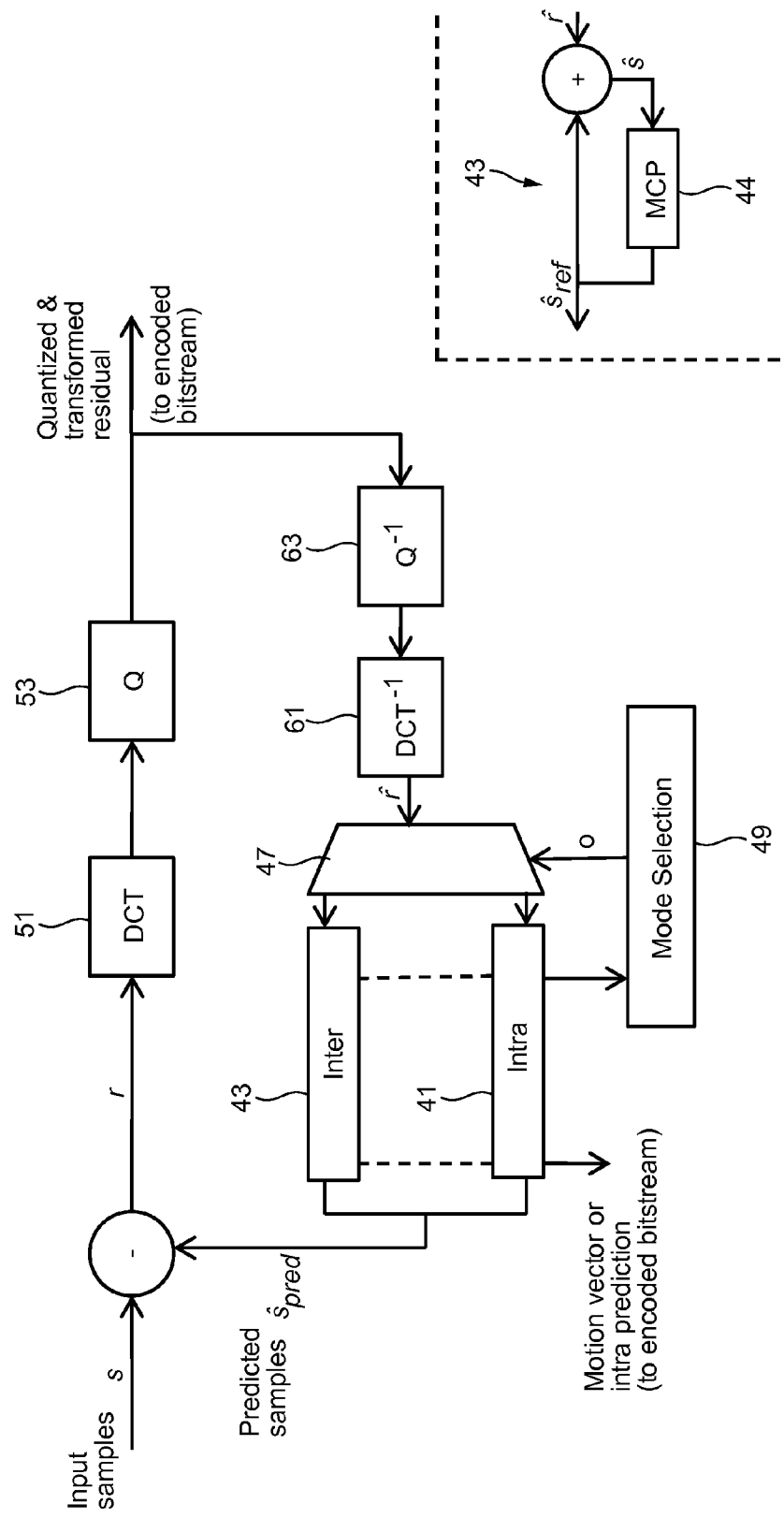
FIG. 3, is a schematic block diagram of an encoder.

FIG. 3 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, and a subtraction stage (−). The encoder also comprises a switch 47 and mode selection module 49. Each of the modules is preferably implemented as a portion of code stored on the transmitting terminal's storage medium 14 and arranged for execution on its processing apparatus 16, though the possibility of some or all of these being wholly or partially implemented in dedicated hardware circuitry is not excluded.

Each of the switch 47 and mode selection module 49 is arranged to receive an instance of the input video stream comprising a plurality of macroblocks MB. The mode selection module 49 is arranged to select a coding mode "o" for each macroblock and is operatively coupled to the multiplexer 47 so as to control it to pass the output of the inverse quantizer 63 to the input of either the intra prediction module 41 or inter prediction module 43 as appropriate to the selected mode. The mode selection module 49 may also be arranged to indicate the selected mode "o" to the relevant prediction module 41, 43 (e.g. to indicate a 4×4 partition mode, 8×8 mode, skip mode, etc), and to receive information fed back from the prediction module 41, 43 for use in selecting the modes for the next frame. The output of the intra prediction module 41 or inter prediction module 43 is then coupled on to an input of the subtraction stage (−) which is arranged to receive the unencoded input video stream at its other input and subtract the predicted blocks from their unencoded counterparts, thus generating the residual signal. The residual blocks are then passed through the transform (DCT) module 51 where their residual values are converted into the frequency domain, then to the quantizer 53 where the transformed values are converted to discrete quantization indices. The quantized, transformed signal is fed back though the inverse quantizer 63 and inverse transform module 61 to generate a predicted version of the blocks or subblocks (as would be seen at the decoder) for use by the selected prediction module 41, 43. An indication of the predictions used in the prediction modules 41, 43, the motion vectors generated by the inter prediction module 43 and the quantized, transformed indices of the residual as generated by the transform and quantization modules 51, 53 are all output for inclusion in the encoded video stream; typically via a further, lossless encoding stage such as an entropy encoder (not shown) where the prediction values and transformed, quantized indices may be further compressed using lossless encoding techniques known in the art.

Figure 1A:
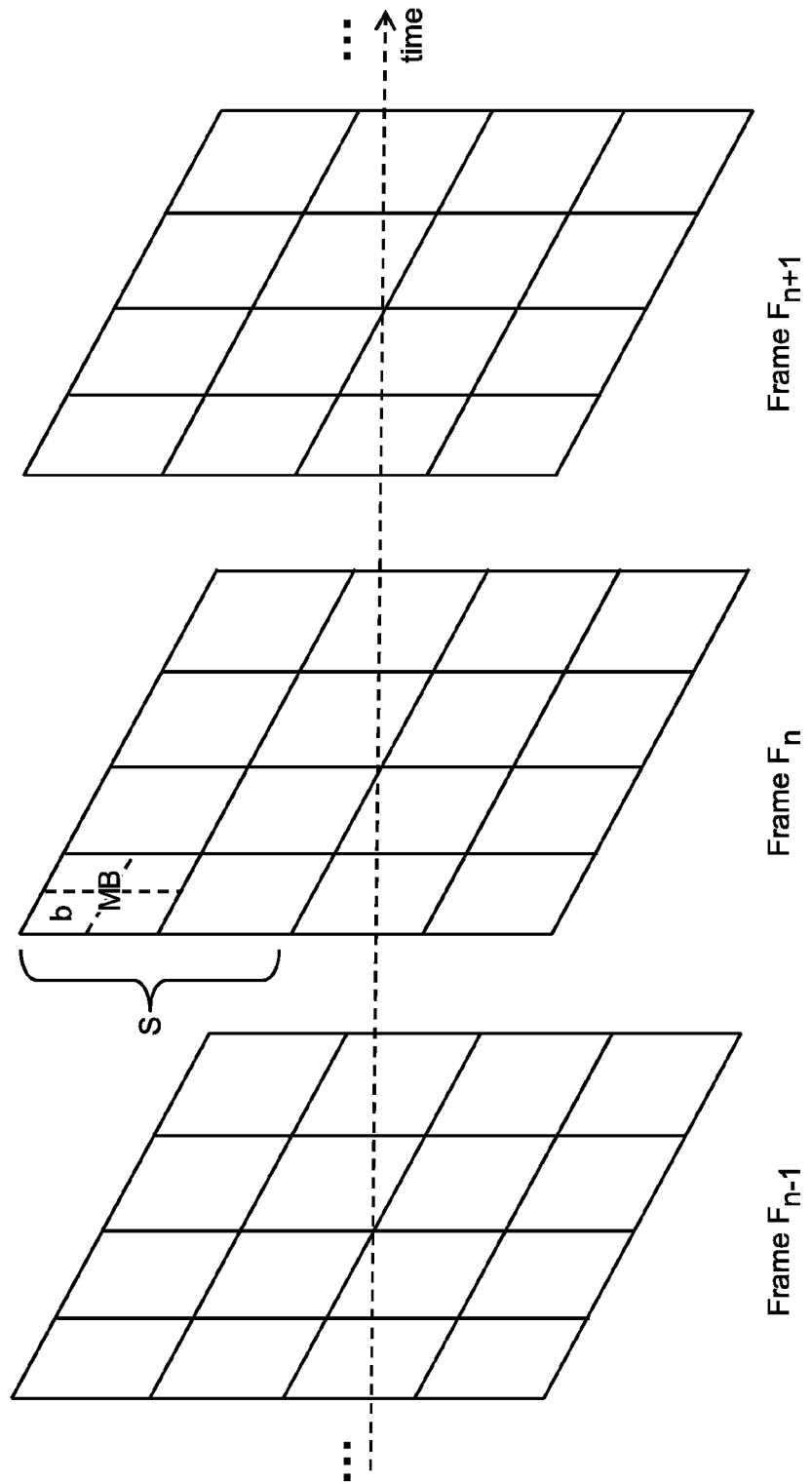
FIG. 1a is a schematic representation of a video stream.
Figure 1B:
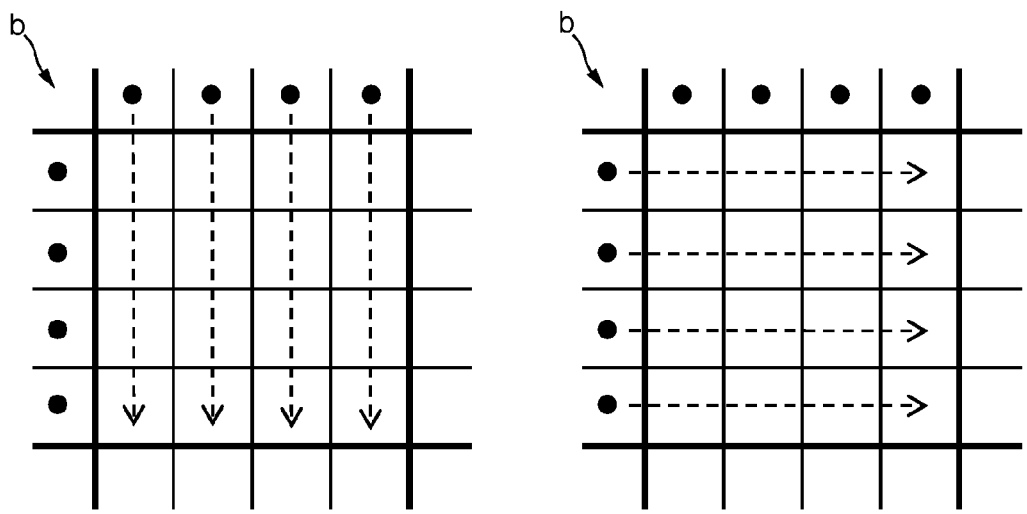
FIG. 1b is a schematic representation of some intra prediction coding modes.

The following describes an encoding system and method which make use of information being fed back from the decoder to the encoder, e.g. the packet and/or frame arrival status, in order to further adapt the loss-adaptive rate-distortion optimization process and thereby improve the overall rate-distortion performance. The encoder is similar to that described in relation to FIG. 3, but with a modified mode selection module 49. It may be used to encode a video stream of the kind illustrated in FIG. 1, and implemented in a communication system such as that of FIG. 2.

As mentioned, mode selection may involve optimizing (e.g. minimizing) a Lagrangian type function:

$$J=D(m,o)+\lambda R(m,o), \quad (1)$$

where J represents the Lagrange function, D represents a measure of distortion (a function of mode o and macroblock m or macroblock sub-partition), R is the bitrate, and λ is a parameter defining a trade-off between distortion and rate.

In a conventional case the distortion term D only takes into account the source coding distortion, i.e. due to imperfections in the encoder such as the distortion introduced by quantization. It does not take into account the distortion that may be introduced due to loss of data over the channel, e.g. due to packet loss in transmission over a packet-based network 32.

On the other hand, loss adaptive techniques such as those of the present invention and Zhang et al. attempt to define a measure of "end-to-end" distortion taking into account both the source encoding and the distortion due to loss of data over the channel. The end-to-end distortion for a given (target) block, macroblock or subblock may be described as:

$$D=(1-p)D_{arrival}+pD_{loss} \quad (5)$$

where $D_{arrival}$ is an estimate of the distortion that will be experienced if the target block does arrive at the decoder, and $D_{loss}$ is an estimate of the distortion that will be experienced if the target block does not arrive at the decoder due to packet loss over the channel, e.g. due to loss of a packet comprising that block over a packet-based network 32. The parameter p is an estimate of the probability of a loss event occurring over the channel that results in the block or image portion in question being lost, e.g. an estimate of the probability of a packet loss. For convenience the term "block" may be used in places here to refer generally to the relevant level of frame partition (e.g. a block or subblock of certain standards such as H.264).

$D_{arrival}$ represents not only the source coding distortion but also the distortion that will be introduced due to distortion of a block's past, i.e. distortion in one or more reference blocks from which the target block is to be predicted. Therefore $D_{arrival}$ comprises both a source coding distortion term $D_s$ and an error propagation distortion term $D_{ef\_ref}$ which represents a distortion in the predicted target block's history (i.e. distortion in the target blocks' reference block which will carry forward into the target block):

$$D_{arrival}=D_s+D_{ep\_ref} \quad (6)$$

$D_{loss}$ comprises a loss due to concealment. If a target block is not received then the decoder will apply a concealment algorithm which could involve freezing a previously decoded block, or interpolating or extrapolating from one or more successfully decoded blocks (either from the current frame and/or a previous frame). Therefore $D_{loss}$ can be identified as the distortion due to this concealment process:

$$D_{loss} = D_{ec} \tag{7}$$

So examining equation (5), the term $D_s$ represents an estimate of the distortion that will be experienced if there is no loss at all, the term $D_{ec}$ represents an estimate of the distortion that will be experienced if the target block is lost, and the term $D_{ep\_ref}$ represents an estimate of the distortion that will be experienced if the target block is successfully received but something in its history is lost (if the target block's reference block is lost, or the reference block's reference block is lost, etc.)

$D_s$ and $D_{ep\_ref}$ are functions of encoding mode selection o. $D_{ec}$ is not a function of mode selection o and so is dropped from the Lagrange expression (it does not matter how a lost block was encoded—it is still lost). Hence the optimization can be written as:

$$o_{opt} = \underset{o}{\arg\min}(D_s(m, o) + D_{ep\_ref}(m, o) + \lambda R(m, o)), \tag{2}$$

$D_s$ is deterministic as it is based on information that can be known at the encoder, for example based on the difference between the raw input sample values s and the reconstructed sample values ŝ. The encoder runs a parallel instance of the decoder at the encoder side (or an approximation of it)—see the inset detailing the inter prediction module 43 in FIG. 3. The inter prediction module 43 comprises a motion compensation prediction (MCP) block 44 and addition stage (+) arranged to determine the reconstructed samples ŝ by combining the predicted samples $\hat{s}_{pred}$ and the reconstructed residual r̂, i.e. $\hat{s}_i = \hat{r}_i + \hat{s}_{pred}$ for each sample index i. In the case of inter encoding, at the encoder the predicted samples $\hat{s}_{pred}$ may be the same as the samples of the reference block $\hat{s}_{ref}$ (the reference block in the reference frame just being offset by the motion vector relative to the target frame—see FIG. 1*c*, to be discussed again shortly).

Hence the encoder can determine the difference between the actual samples s and the reconstructed samples ŝ as seen at the encoder and decoder end (this so far ignores the possibility of loss which will introduce further distortion experienced at the decoder). The difference in samples may be calculated for example as the sum square difference (SSD) error over all sample indices i of the target block in question:

$$D_s = \sum_i [(s_i - \hat{s}_i)^2] \tag{8}$$

However, $D_{ep\_ref}$ remains to be estimated, which will be based on making some estimation concerning the channel over which the encoded data is to be transmitted (e.g. over packet-based network 32).

To achieve this, the mode selection module 49 in the encoder may be configured to maintain an error propagation distortion map $D_{ep}$ describing the distortion of each macroblock or partition of a macroblock within the most recently encoded frame. The mode selection module 49 is also arranged to determine a probability p that the packet containing the reference block from which a target block is to be predicted will be lost over the channel (and therefore also to implicitly or explicitly determine a probability 1−p that the packet does arrive). The probability p may be predetermined at the design stage based on statistical modeling, in which case the mode selection module 49 determines p by retrieving a value from memory 14. However, another possibility would be that the mode selection module 49 determines p based on feedback from the receiver 22.

The error propagation map may be expressed as:

$$D_{ep} = (1-p)D_{ep\_arrival} + pD_{loss} \tag{9}$$

The error propagation map $D_{ep}$ comprises a distortion estimate for macroblock m or more preferably for each sub partition (block or sub-block) m(k) within the most recently encoded frame. Hence it may be more explicitly written as:

$$D_{ep}(m(k)) = (1-p)D_{ep\_arrival}(m(k)) + pD_{loss}(m(k)) \tag{10}$$

where m(k) denotes the $k^{th}$ sub-partition (e.g. sub-block) of macroblock m and p the probability of packet loss.

$D_{loss}$ is equal to $D_{ec}$ as discussed above. $D_{ep\_arrival}$ represents the differences over the channel, i.e. the difference between the reconstructed samples at the encoder and the reconstructed at the decoder. For example this could be quantified in terms of the sum of squared differences (SSD):

$$D_{ep\_arrival} = \sum_i (\hat{s}_i - \tilde{s}_i)^2 \tag{11}$$

where $\tilde{s}_i$ are the samples (of indices i) received at the decoder taking into account both the source coding distortion and the distortion due to the channel I.e. $s_i$ are the raw unencoded input samples, $\hat{s}_i$ are the reconstructed samples at the encoder taking into account the source coding distortion (e.g. due to quantization), and $\tilde{s}_i$ are the samples taking into account the total end-to-end distortion including the lossy effect of the channel; $s_i \to \hat{s}_i \to \tilde{s}_i$.

$D_{ep\_arrival}$ can be expanded to:

$$D_{ep\_arrival} = \sum_i ((\hat{s}_{ref} + \hat{r}_i) - (\tilde{s}_{ref} + \hat{r}_i))^2 \tag{12}$$

where $\hat{r}_i$ are the samples of the reconstructed residual. Therefore:

$$D_{ep\_arrival} = \sum_i (\hat{s}_{ref} - \tilde{s}_{ref})^2 = D_{ep\_ref} \tag{13}$$

So substituting into equation (9), the error propagation map can be rewritten as:

$$D_{ep} = (1-p)D_{ep\_ref} + pD_{ec} \tag{14}$$

or:

$$D_{ep}(m(k)) = (1-p)D_{ep\_ref}(m(k)) + pD_{ec}(m(k)) \tag{15}$$

Considering the mode optimization problem, it may also be written:

$$D_{ep}(m(k), n+1) = (1-p)D_{ep\_ref}(m(k), n, o_{opt}) + pD_{ec}(m(k), n, o_{opt}) \tag{16}$$

where n is the frame number, i.e. $D_{ep}(n+1)$ is the error propagation map to be used for making the mode selection for frame at a time n+1 given the existing decision $o_{opt}$ and distortion $D_{ep}(n)$ map for frame at a preceding time n.

As in Zhang et al., the $D_{ec}$ term may be also expanded:

$$D_{ep}(m(k),n+1)=(1-p)D_{ep\_ref}(m(k),n,o_{opt})+p(D_{ec\text{-}rec}(m(k),n,o_{opt})+D_{ec\text{-}ep}(m(k),n)), \quad (3)$$

where $D_{ec\text{-}rec}$ denotes the SSD between the reconstructed and error concealed pixels in the encoder, and $D_{ec\text{-}ep}$ the expected SSD between the error concealed pixels in the encoder and decoder.

Examining equation (3), as explained above, the term $D_{ep\_ref}$ represents the distortion that will be experienced if the target block is successfully received but something in its history is lost (if the target block's reference block is lost, or the reference block's reference block is lost, etc.). Further, $D_{ec\text{-}rec}$ represents an estimate of the distortion due to the nature of the concealment algorithm itself (somewhat analogous to the intrinsic source coding distortion $D_s$ for prediction). $D_{ec\text{-}ep}$ then represents an estimate of the distortion that will be experienced if both the target block is lost (and so needs to be concealed at the decoder) and something in the concealed target block's history is lost (if the block from which concealment is done is lost, or the block from which that block is predicted or concealed is lost, etc.).

So the distortion map $D_{ep}$ comprises a contribution due to new loss, resulting from $D_{ec\text{-}rec}$ and in part from $D_{ec\text{-}ep}$; and a contribution due to past loss, resulting from $D_{ep\_ref}$ and in part also from $D_{ec\text{-}ep}$.

For the first frame in a sequence the frame will be coded with intra coding, in which case $D_{ep\_ref}=0$ and therefore $D_{ep}=pD_{ec}$.

The error concealment distortion $D_{ec}$ is calculated by the mode selection module 49. The term $D_{ec\text{-}rec}$ is based on knowledge of the concealment algorithm, and may depend on the particular error concealment algorithm used. $D_{ec\text{-}ep}$ is calculated based on the existing (most recent) distortion map in a manner analogous to $D_{ep\_ref}$, e.g. by copying the distortion of a co-located block in the case of a basic concealment algorithm or calculating a weighted sum of the distortions from multiple previously encoded blocks b1-b4 if a more complex concealment is used that attempts to extrapolate motion (by analogy see discussion in relation to FIG. 1c below). Other ways of calculating $D_{ec}$ could be used—this could be any estimation of a difference between the reconstructed samples in the encoder and the error concealed samples as would be seen by the decoder (i.e. the samples copied, interpolated or extrapolated from a previous received frame or a received region of the same frame to conceal the lost frame or region).

The mode selection module 49 then maintains the error propagation map for each subsequent inter predicted frame by updating it following each mode selection decision, now including a calculation of $D_{ep\_ref}$ from knowledge of the existing error map. In the case of inter prediction (motion estimation), according to Zhang et al. this is done using the motion vectors for the frame in question.

Figure 1C:
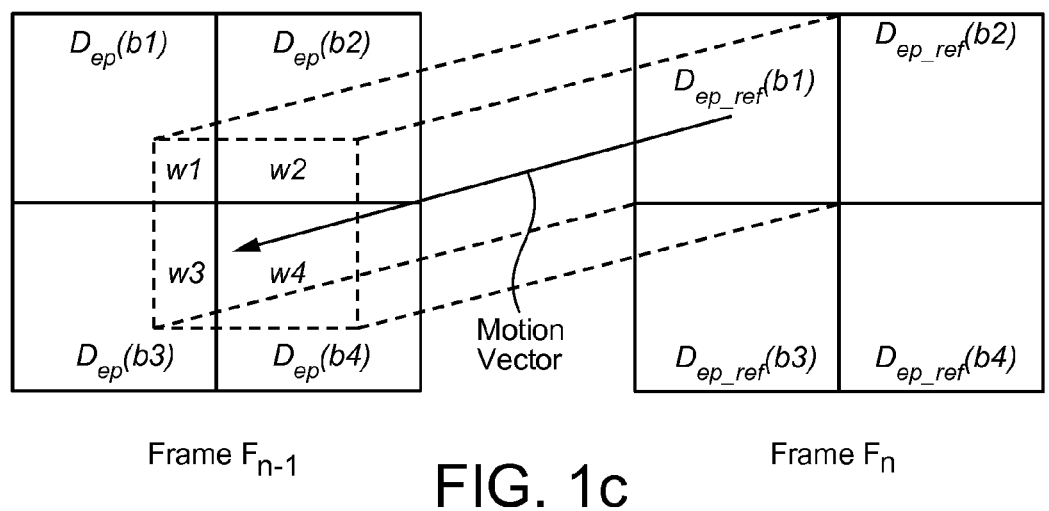
FIG. 1c is a schematic representation of a calculation of error propagation distortion.

An example of this is illustrated in FIG. 1c. Four example blocks b1, b2, b3 and b4 are shown in a reference frame $F_n$ (at time n−1), the reference frame having already been encoded. The blocks of the target frame $F_n$ (at a subsequent time n) are to be predicted from the reference frame $F_{n-1}$. For example consider a target block $b_1$ in the target frame $F_n$. To this end the motion prediction module 44 determines a motion vector defining an offset between the target block in the target frame $F_n$ and a reference block (shown by the dotted line) in the reference frame $F_{n-1}$, such that when the reference block is translated from the offset position in the reference frame $F_{n-1}$ into the position of the target block $b_1'$ in the target frame $F_n$ it provides a best estimate of the target block $b_1$. Note therefore that the dotted reference block is not necessarily an indexable block in the reference frame $F_{n-1}$, i.e. is not necessarily a predetermined subdivision of the reference frame, and may be offset by any arbitrary amount (and in fact may even be offset by a fractional number of pixels). Hence the reference block is made up of a contribution from four actual indexable blocks b1, b2, b3 and b4.

Accordingly, the existing calculation performed by the mode selection module 49 to determine $D_{ep\_ref}$ for use in the update of the error propagation map $D_{ep}(n+1)$ comprises calculating a weighted sum of the distortions recorded for blocks or subblocks b1 to b4 in the existing map $D_{ep}(n)$:

$$D_{ep-ref} = \sum_{i=1}^{4} w_i D_{ep}(i) \quad (17)$$

Or more explicitly:

$$D_{ep\_ref}(m(k), n) = \sum_{i=1}^{4} w_i D_{ep}(b_i, n-1), \quad (4a)$$

where $w_i$ is the weight representing the contribution from block or subblock $b_i$ and $D_{ep}(i)$ is the error propagation map entry for block or subblock $b_i$.

The above describes an existing process of determining an initial error propagation map $D_{ep}$, using the error propagation map to select an optimal coding mode decision $o_{opt}$ for a subsequent coding, using the coding decision to update the map $D_{ep}$, then using the updated map in the next coding decision, and so forth, wherein the error propagation map represents an end-to-end distortion including an estimated effect of loss over the channel. E.g. reference is made again to Zhang et al. This may be referred to herein as loss-adaptive rate-distortion optimization (LARDO).

However, the process of Zhang et al. is based only on a priori probabilistic assumptions made purely at the encoder about the likelihood of loss over the channel.

The present invention provides an improvement over Zhang et al. by making make use of information being fed back from the decoder to the encoder, e.g. the packet and/or frame arrival status, to further adapt the loss-adaptive rate-distortion optimization process in the encoder and thereby improve the overall rate-distortion performance.

Figure 4:
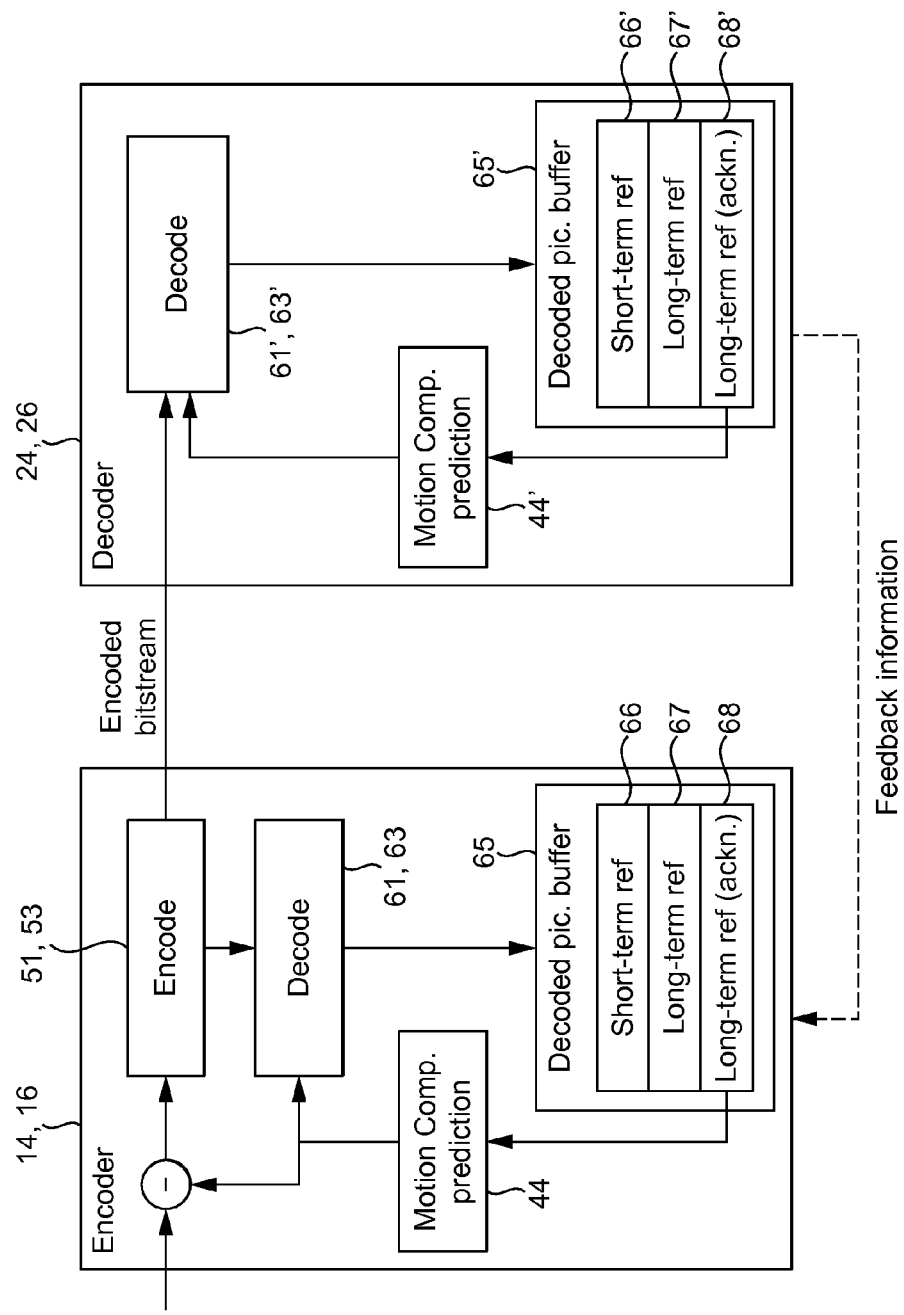
FIG. 4 is a schematic block diagram of a system employing feedback from a decoder to an encoder.

FIG. 4 is a schematic block diagram depicting a system of encoder and decoder that may be used to implement the present invention. Preferably the encoder is manifested in the storage 14 and processing apparatus 16 of the transmitting terminal 12, and the decoder is manifested in the storage medium 24 and processing apparatus 26 of the receiving terminal 22. The encoder on the transmitting terminal 12 comprises an encoding module and an encoder-side instance of a decoding module mirroring or approximating the decoding as performed at the decoder. The encoding module comprises the forward transform module 51 and quantizer 53, as well as potentially one or more other stages such as an entropy encoder (not shown). The encoder-side decoding module comprises the inverse quantizer 63 and inverse transform module 61, as well as potentially other stages such as an entropy decoder. The encoder also comprises the motion compensation prediction (MCP) module 44, and subtraction stage (−). Reference is made again to FIG. 3 for an explanation of the connections between these encoder elements.

Furthermore, not shown in FIG. 3 is that the encoder also comprises a decoded picture buffer 65 connected in the path between the encoder-side decoding module 61, 63 and the motion compensation prediction module 44. The decoded picture buffer 65 comprises a plurality of constituent buffer regions each of which may be marked as holding either a short-term reference or a long-term reference. In H.264 there is only one actual buffer in which markers are used to indicate long-term references (but the possibility of separate, dedicated short and long term buffers in other implementations is not excluded). In FIG. 4 the decoded picture buffer 65 is shown as holding one or more short-term references 66, one or more unacknowledged long-term references 67, and one or more acknowledged long-term references 68.

Each constituent buffer region is operable to store a reconstructed version of one or more previously encoded frames or slices (i.e. having been encoded and then decoded again by the encoder-side instance of the decoding module 61, 63 so as to represent the frame or slice as would be seen at the encoder). These reconstructed versions of previously encoded frames or slices are provided for use as a reference in the inter prediction coding of a current frame or slice, i.e. so that target blocks to be encoded can be coded relative to reference blocks in the buffers.

The decoded picture buffer 65 is arranged such that a short-term reference 66 is automatically updated with each successive frame or slice that is encoded. I.e. as each frame or slice is encoded, then the decoded version of that new frame or slice automatically overwrites another recent reference frame or slice that was previously held in the short-term buffer. In preferred embodiments the decoded picture buffer 65 can hold multiple short-term references 66 and the oldest short-term reference is always the reference that is overwritten in the buffer. No additional condition is required for this to happen.

As mentioned, the H.264 AVC standard also allows certain reference frames or slices to be marked as long-term references 67, 68. These long-term references remain in the decoded picture buffer until explicitly removed. I.e. they are not automatically overwritten by successively encoded frames or slices, but instead are only overwritten or otherwise removed upon an additional condition that another action or element of the encoder triggers it, e.g. a control command such as a memory management command. The control command may be issued by a controller (not shown) of the encoder which decides what actions to be taken. The command for clearing the long-term buffer may be sent to the decoder in a header of the encoded bitstream such as a slice header. A similar functionality could also be incorporated into other standards.

The decoder on the receiving terminal 24 comprises decoder-side instances 44', 61', 63', 65', 66', 67' and 68' of the motion compensation prediction module 44, decoding module 61, 63, and decoded picture buffer 65 arranged to store corresponding short and long term references 66, 67 and 68.

The decoder on the receiving terminal 24 is configured to communicate with the encoder on the transmitting terminal 12 via a feedback channel. The feedback is preferably via the same network 32 by which the video stream is transmitted to the receiving terminal 22, e.g. the same packet-based network such as the Internet, though the possibility of an alternative feedback mechanism is not excluded.

By way of example, the long-term references may be managed by the controller as follows. Say it is decided to maintain two long-term references in the decoded picture buffer (e.g. lt pos 0 and lt pos 1). The first frame (at a time t0) that is encoded may be placed into lt pos 0. It may be assumed that the first frame will arrive at the decoder (the feedback from the decoder will arrive after one RTT) and therefore lt pos 0 is initially marked as error-free acknowledged. The next frame marked as a long-term reference is the frame at time t0+RTT, which is placed at lt pos 1. If the encoder gets the feedback from the decoder indicating that the reference at lt pos 1 arrived (and contained no error propagation) then lt pos 1 is marked as error-free acknowledged and the next long-term reference frame (at time t0+2*RTT) is placed into lt pos 0. Thus, the two positions form a ping-pong buffer where there's always one position that is error-free acknowledged and one position that is used temporarily for probing. This way there should always be a fairly recent acknowledged error-free reference in the decoded picture buffer that can be used to generate a recovery frame from in case of a loss. In principle, the closer the lt-ref frame is to the current time position the more efficient is the inter coding, and thus, the smaller (in bits) the recovery frame will be. However, this is only one strategy the encoder's controller may be configured to use to manage long-term references, described for the sake of example, and it will be appreciated that other ways of managing a system of long- and short-term references in a picture buffer are possible (e.g. an even better way is to provide more lt-refs).

With reference to the exemplary implementation of FIG. 4, the present invention considers the feedback to contain information about the decoded picture buffer 65' at the decoder. Given this feedback the encoder knows for example which frames or slices in the decoder were decoded without containing any error-propagation distortions. In FIG. 4 the entry 68 in the decoded picture buffer 65 refers to such an acknowledged error-free frame. The entry 67 in the decoded picture buffer 65 refers to an unacknowledged frame. The feedback mechanism can be used to make the encoder aware of what is the latest acknowledged long-term reference available at the decoder (in addition to information about which frames have been lost). In the following, an acknowledged reference preferably means an acknowledged error-free reference (i.e. a reference without any error-propagation distortion), rather than just a reference that is acknowledged in itself. That is, the references should preferably be acknowledged according to a strict definition that the reference is acknowledged as received and everything relevant in that reference's history was also acknowledged as received, so that it can be known there is no error propagation; as opposed to it just being acknowledged that the current reference is received without strict acknowledgement of its history. Note that a portion in a frame that is only acknowledged in itself, but which is encoded relative to error-free blocks, is also error-free (no propagation error).

According to a first embodiment of the present invention, inter prediction based on acknowledged long-term reference frames (or slices) can be used to stop error propagation in the decoder in a similar manner to intra coding. The benefit of using inter prediction from a long-term reference is that inter prediction generally results in a lower bitrate for a given distortion level.

By using the acknowledged long-term references for inter prediction, the first embodiment of the present invention makes available an additional macroblock coding mode, to be used for example within the framework of Zhang et al., that can stop error propagation similar to intra coding, but in general at a lower associated bitrate.

The algorithm by Zhang et al. considers only two different types of coding mode, intra and inter coding. In that case the error-propagation reference distortion $D_{ep-ref}(m, o)$ is zero only for the intra coded macroblock modes in equation (3).

However, the first embodiment of the present invention augments the set of available coding modes to include inter coding from acknowledged long-term references. The advantage of such a coding mode is that it can stop the error propagation in a similar manner to intra coding, but at a lower bitrate in general.

The required change to the algorithm presented above is that the error-propagation reference distortion in equations (2) and (3) is set to zero also when the coding mode is inter encoding from an acknowledged reference frame, i.e.:

$$D_{ep-ref}(m, o) = \begin{cases} \sum_k w_k D_{ep}(m'(k)), & \forall o \in "nonackn.INTER" \\ 0 & INTRA \text{ and } "ackn.INTER". \end{cases}$$

In certain variants of the first embodiment, the above example can be modified in the following way. Consider the scenario where the encoder marks, at e.g. a regular spacing dependent on the round trip time (RTT), a reference frame as a long-term reference. Thus, the decoded picture buffer 65 (as shown in FIG. 4) will at some time instance contain a short-term reference 66, a "non-acknowledged" long-term reference 67, and an acknowledged long-term reference 68. For the "non-acknowledged" long-term reference 67 to become acknowledged at the decoder according to a strict definition, it would be required that there are no losses prior to the non-acknowledged long-term reference, i.e. that the acknowledged long-term reference is a decoded frame without any error-propagation distortion. At the encoder side feedback is received conveying information as to what frames have been received by the decoder. Given that the encoder knows exactly what frames were marked as (non-acknowledged) long-term references and has an estimate p of the packet or frame loss probability, it is possible to setup a model for the probability that the non-acknowledged long-term reference will convert into an acknowledged long-term reference. If the frame loss probability is p and there is a known or predetermined interval L between two long-term references, then the a priori probability that the non-acknowledged long-term reference will become acknowledged is $(1-p)^L$. Gradually, as positive feedback information is received, e.g. the decoder has received l out of the L frames so far, the probability that the long term reference will be acknowledged change from $(1-p)^L$ to $(1-p)^{(L-l)}$. The described probability model can now be used to generalize the equations for $D_{ep-ref}(m, o)$ above as:

reference based on intermediate reports from the decoder. For the non-acknowledged long-term reference, the estimate of error propagation distortion $D_{ep-ref}(m, o)$ may therefore be weighted in dependence on the a priori estimate of the probability of loss (i.e. p is not in itself based on feedback), and based on the time (or equivalently number of frames) since the last (most recent) acknowledged long-term reference in the non-acknowledged reference's history. The weight attenuates the estimate of distortion, so as to reduce or dampen the estimate.

It may be noted that the above logic is just an example embodiment and in the form above is somewhat conservative in that it assumes that all losses have an impact on the frame marked as long-term reference. The logic above can be refined so as to only take into account losses of frames or slices affecting the long-term reference frame.

In yet another generalization, consider the case where the long-term reference has been received by the decoder, but there were losses prior to the long-term reference. Thus, the long-term reference is not "acknowledged" according to the strict definition above. However, if the mode decisions have been stored for all the macroblocks of the frame, the parts where the corresponding mode was set to intra or acknowledged long-term reference are then associated with zero error-propagation reference distortion, and thus inter-prediction referenced from those regions break error propagation at a potentially lower rate-distortion cost compared to intra coding.

Although the example embodiments above are all based on the concept of long-term references and feedback reporting, the same concept may apply to short-term references when the round-trip time (RTT) is sufficiently low compared to the number of short-term references in the decoded picture buffer. That is, for a sufficiently small RTT, an alternative or additional possibility is to recognize short-term references as being acknowledged, which can then be used in a similar way to the acknowledged long-term references discussed above. The required algorithmic change to equation (3) in the previous section is that $D_{ep-ref}(m, o)$ is set to zero not only for intra coding but also for inter coding from acknowledged references.

The generalizations to the first embodiment discussed above improve the flexibility in making trade-offs between robustness and source coding.

On an additional point, LARDO per default assumes constrained intra prediction, i.e. intra prediction from inter predicted macroblocks is prohibited. However, the inventors $$D_{ep-ref}(m, o) = \begin{cases} \sum_k w_k D_{ep}(m'(k)), & \forall o \in INTER \text{ "}ShortTerm" \\ (1-p)^{L-l} \sum_k w_k D_{ep-LTref}(m'(k)), & \forall o \in INTER \text{ "}non-ackn \ LongTerm" \\ 0 & INTRA \text{ and } "ackn.LongTerm" \end{cases}$$

where $D_{ep-LTref}(m(k))$ denotes the expected error-propagation for the non-acknowledged long-term reference (simply a copy of $D_{ep}$ for that frame).

Thus this variant of the first embodiment introduces yet another encoding mode which distinguishes the use of inter prediction based on a non-acknowledged long-term reference from the use of inter prediction based on a non-acknowledged short term reference. For a certain long-term reference for which no feedback has yet be received, this nonetheless has a certain probability of becoming an error-free acknowledged have observed that constrained intra prediction can in fact cause severe coding distortions (especially on smooth gradient picture areas). Therefore, in a particularly preferred variant of the present invention, LARDO should be run without constrained intra prediction. The implication is that the intra coding mode (when predicted from an inter-predicted macroblock) is also associated with an error-propagation reference distortion, and thus, the only mode that is not associated with an error-propagation reference distortion is inter prediction from acknowledged error-free reference pictures.

In a second embodiment of the present invention, information fed back from the decoder to the encoder such as the packet and/or frame arrival status is used to adjust the potential distortion maps in the encoder, and thereby improve the overall rate-distortion performance compared to the method by Zhang et al.

According to the second embodiment, the error propagation distortion map $D_{ep}$ for each frame or slice of a frame is stored in association with that frame or slice in the decoded picture buffer 65 of the encoder. For each frame or slice, the decoded picture buffer 65 at the encoder also stores the corresponding error concealment reconstruction distortion map $D_{ec\text{-}rec}$, error concealment error propagation map $D_{ec\text{-}ep}$, corresponding mode decisions o and motion vector information. The feedback information from the decoder is then used by the encoder to update the distortion maps. Refer again to equation (3). The feedback information allows the estimated distortion tracking to be refined, yielding better rate-distortion performance.

Preferably this is achieved as follows. If the encoder receives feedback information signaling that a particular frame or slice has successfully arrived at the decoder, the error concealment contributions $D_{ec\text{-}rec}$ and $D_{ec\text{-}ep}$ can be removed from the error propagation distortion map $D_{ep}$ in equation (3). Conversely, if feedback information is received signaling that a particular frame or slice was lost at the decoder, the associated error propagation distortion map $D_{ep}$ is recomputed so as to only include the contributions from the error concealment distortion, i.e. the second and third term in the right hand side of equation (3), $D_{ec\text{-}rec}$ and $D_{ec\text{-}ep}$ (normalized by the a priori loss probability estimate p).

Then, if the round trip time (RTT) is small in comparison to the number of reference pictures in the decoded picture buffer, it is possible to propagate the adjusted potential error-propagation map $D_{ep}$ at time n-RTT to the error propagation distortion map at time n-1 by applying equation (3) recursively. The updated error propagation distortion map $D_{ep}$ at time n-1 will then be the basis for the computation of the $D_{ep\_ref}$ at time n which is used in the mode selection process (2). This results in a more accurate tracking of the potential distortion maps, and thus, improves the overall rate-distortion performance of the system.

It will be appreciated that the above embodiments have been described only by way of example.

Generally, while the above has been described in terms of slices, macroblocks and blocks or sub-blocks, these terms are not necessarily intended to be limiting and the ideas described herein are not limited to any particular way of dividing or subdividing a frame. Further, the distortion map may cover a whole frame or a region within a frame, and coding decision process may be applied over the whole frame or only for a region within a frame. Note also that the prediction block granularities do not have to be the same as or even connected to the distortion map granularity (though that possibility is not excluded).

The sum of squared differences (SSD) is often preferred as measure of difference since it results in higher quality compared to sum of absolute differences (SAD), but the latter possibility or other possibilities are not excluded and generally the invention could be implemented using any measure of difference between samples as a basis for quantifying distortion.

Commonly, the measure of rate also accounts for coding of all needed parameters, including parameters describing prediction and quantized transform coefficients. This kind of optimization may be referred to herein as full rate-distortion optimization (RDO). In lower complexity embodiments however, the distortion and/or rate term may be approximated by only taking into account the effect of some but not all processing stages, e.g. only taking into account the effect of prediction.

Further, where the present invention is described in terms of two frames n-1 and n, or n and n+1 or such like, according to certain embodiments of the invention it is not necessary for these to refer to two adjacent frames (though that may be the case in existing codecs). In some embodiments it is possible that inter prediction could be performed relative to an even earlier frame, and as such n-1 and n, or n and n+1, may be used in relation to the present invention to refer respectively to any previously encoded frame or image portion and a subsequent frame or portion to be predicted from it.

Note again that where a contribution due to loss is mentioned in this application, or anything stating what happens "if" data lost over the channel or such like, this only relates to a probabilistic assumption (e.g. p) made by the encoder about what might be experienced by the decoder—the encoder of course does not know what will happen. The probabilistic assumption may be predetermined at the design stage based on statistical network modeling, and/or could even be determined dynamically based on feedback from the decoder.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Other variants may become apparent to a person skilled in the art given the disclosure herein. The scope of the invention is not limited by the described embodiments but only by the appendant claims.

What is claimed is:

1. A method of encoding a video stream at an encoder of a transmitting terminal for transmission over a lossy channel to a decoder at a receiving terminal, the method comprising:
performing a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, the estimate of distortion being based on source coding distortion and an estimate of a distortion that would be experienced due to possible loss over the channel, the rate-distortion optimization process for a current one of said frames being performed in dependence on feedback received from the receiving terminal based on an earlier one of said frames;

encoding the target image portion into the encoded video stream using the selected encoding mode;

transmitting the encoded video stream over the channel;

running an encoder-side instance of the decoder at the encoder, and maintaining at the encoder a decoded picture buffer storing error propagation distortion maps associated for each frame that is stored in the decoded picture buffer;

updating the error propagation distortion maps based on said feedback for use in each respective subsequent encoding mode selection, said updating effective to improve rate-distortion performance;

the set of encoding modes including a non-acknowledged long-term reference inter prediction mode which encodes the target image portion relative to a corresponding long-term reference in an unacknowledged frame or part of a frame stored in the decoded picture buffer; and performance of the rate-distortion optimization process in dependence on said feedback comprises determining a weighted estimate of distortion due to loss in dependence on an estimated probability of loss and a time since a last acknowledged earlier frame or acknowledged part of an earlier frame.

2. The method of claim 1, wherein said feedback comprises one of an acknowledgement that at least part of said earlier frame has been received, and a report that at least part of said earlier frame has not been received, the report and the acknowledgement being determined at the decoder at the receiving terminal.

3. The method of claim 2, wherein the set of encoding modes includes the acknowledged reference inter prediction mode which encodes the target image portion relative to a corresponding reference portion in the acknowledged earlier frame or acknowledged part of the earlier frame, the acknowledged earlier frame being acknowledged by an acknowledgement corresponding to the earlier frame, the acknowledged part of the earlier frame being acknowledged by an acknowledgement corresponding to the at least part of the earlier frame.

4. The method of claim 3, wherein the acknowledged reference inter prediction mode is available for use in the encoding mode selection on condition that the reference portion is acknowledged as received and anything relative to which the reference portion was encoded has also been acknowledged as received, such that the reference portion is known to incur no error propagation.

5. The method of claim 3, wherein the performance of the rate-distortion optimization process in dependence on said feedback comprises: setting the estimate of distortion due to loss to nothing on condition that the feedback comprising said acknowledgement is received.

6. The method of claim 3, wherein the decoded picture buffer further includes storing short and long term references in the form of reference image data reconstructed by the encoder-side instance of the decoder, the short-term references being overwritten automatically by successive frames, and the long term references being removed based on a condition of an explicit removal command; and wherein the acknowledged reference inter prediction mode encodes the target image portion relative to a corresponding one of the long-term references in the decoded picture buffer acknowledged to have been received at the receiving terminal.

7. The method of claim 1, wherein the set of encoding modes comprises at least the intra frame mode, at least one non-acknowledged inter frame encoding mode, and said acknowledged inter prediction mode.

8. The method of claim 1, wherein the set of encoding modes also comprises a non-acknowledged short-term reference inter prediction mode.

9. The method of claim 3, wherein the acknowledged reference inter prediction mode encodes the target image portion relative to a corresponding short-term reference in the decoded picture buffer acknowledged to have been received at the receiving terminal.

10. The method of claim 1, wherein the set of encoding modes includes an intra encoding mode which allows intra encoding of a target image portion from an inter encoded reference portion.

11. The method of claim 2, wherein:

the performance of the rate-distortion optimization process in dependence on said feedback comprises: adjusting the estimate of distortion for the earlier frame or part of the earlier frame in dependence on at least one of said acknowledgment and said report, and propagating the adjusted estimate of distortion forward for use in relation to the current frame.

12. The method of claim 1, wherein the estimate of distortion that would be experienced due to possible loss is based on a first contribution representing an estimate of the distortion that would be experienced, if the target portion does arrive over the channel, due to non arrival of a reference portion in the target portion's history from which prediction of the target portion depends, and on a second contribution representing an estimate of distortion that would be experienced due to concealment.

13. The method of claim 12, wherein the second contribution comprises a contribution representing a measure of concealment distortion of the target portion relative to an image portion that would be used to conceal loss of the target portion if the target portion is lost over the channel, and a contribution representing an estimate of distortion that would be experienced due to loss of an image portion in the target portion's history upon which concealment of the target portion depends.

14. The method of claim 12, wherein the performance of the rate-distortion optimization process in dependence on said feedback comprises one or both of: setting the second contribution to nothing for the earlier frame on condition that the feedback comprising said acknowledgement is received, and setting the first contribution to nothing for the earlier frame on condition that the feedback comprising said report of non-receipt is received.

15. A transmitting terminal for encoding a video stream for transmission over a lossy channel to a decoder at a receiving terminal, the transmitting terminal comprising:

an encoder configured to perform a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, the estimate of distortion being based on source coding distortion and an estimate of a distortion that would be experienced due to possible loss over the channel, the encoder further configured to run an encoder-side instance of the decoder at the encoder, and maintain at the encoder a decoded picture buffer storing error propagation distortion maps associated for each frame that is stored in the decoded picture buffer, the set of encoding modes including a non-acknowledged long-term reference inter prediction mode which encodes the target image portion relative to a corresponding long-term reference in an unacknowledged frame or part of a frame stored in the decoded picture buffer, the encoder being arranged to encode the target image portion into the encoded video stream using the selected encoding mode, wherein the rate-distortion optimization process for a current one of said frames is performed in dependence on feedback received from the receiving terminal based on an earlier one of said frames; and a transmitter arranged to transmit the encoded video stream over the channel;

the encoder being further configured to update the error propagation distortion maps based on said feedback for use in each respective subsequent encoding mode selection to improve rate-distortion performance; and performance of the rate-distortion optimization process in dependence on said feedback comprises determining a weighted estimate of distortion due to loss in dependence on an estimated probability of loss and a time since a last acknowledged earlier frame or acknowledged part of an earlier frame.

16. The transmitting terminal of claim 15, wherein the encoder is configured such that said feedback comprises one of an acknowledgement that at least part of said earlier frame has been received, and a report that at least part of said earlier frame has not been received, the report and the acknowledgement being determined at the decoder at the receiving terminal.

17. The transmitting terminal of claim 16, wherein the encoder is configured such that the set of encoding modes includes an acknowledged reference inter prediction mode which encodes the target image portion relative to a corresponding reference portion in the acknowledged earlier frame or acknowledged part of the earlier frame, the acknowledged earlier frame being acknowledged by an acknowledgement corresponding to the earlier frame, the acknowledged part of the earlier frame being acknowledged by an acknowledgement corresponding to the at least part of the earlier frame.

18. The transmitting terminal of claim 17, wherein the encoder is configured such that the acknowledged reference inter prediction mode is available for use in the encoding mode selection on condition that the reference portion is acknowledged as received and anything relative to which the reference portion was encoded has also been acknowledged as received, such that the reference portion is known to incur no error propagation.

19. The transmitting terminal of claim 17, wherein encoder is configured such that the performance of the rate-distortion optimization process in dependence on said feedback comprises: setting the estimate of distortion due to loss to nothing on condition that the feedback comprising said acknowledgement is received.

20. The transmitting terminal of claim 16, wherein the encoder is configured such that:

the performance of the rate-distortion optimization process in dependence on said feedback comprises: adjusting the estimate of distortion for the earlier frame or part of the earlier frame in dependence on said feedback, and propagating the adjusted estimate of distortion forward for use in relation to the current frame; and the performance of the rate-distortion optimization process in dependence on said feedback comprises: adjusting the estimate of distortion for the earlier frame or part of the earlier frame in dependence on at least one of said acknowledgment and said report, and propagating the adjusted estimate of distortion forward for use in relation to the current frame.

21. A computer program product for encoding a video stream at an encoder of a transmitting terminal for transmission over a lossy channel to a decoder at a receiving terminal, the computer program product being embodied on computer-readable storage memory hardware and comprising stored code configured so as when executed on the transmitting terminal to perform operations comprising:

performing a rate-distortion optimization process comprising, for each of a plurality of target image portions to be encoded in each of a plurality of frames, selecting a preferred one of a set of encoding modes by optimizing a function comprising an estimate of distortion for the target image portion and a measure of bit rate required to encode the target image portion, the estimate of distortion being based on source coding distortion and an estimate of a distortion that would be experienced due to possible loss over the channel, the rate-distortion optimization process for a current one of said frames being performed in dependence on feedback received from the receiving terminal based on an earlier one of said frames;

encoding the target image portion into the encoded video stream using the selected encoding mode;

transmitting the encoded video stream over the channel;

running an encoder-side instance of the decoder at the encoder, and maintaining at the encoder a decoded picture buffer storing error propagation distortion maps associated for each frame that is stored in the decoded picture buffer; and updating the error propagation distortion maps based on said feedback for use in each respective subsequent encoding mode selection, said updating effective to improve rate-distortion performance;

the set of encoding modes including a non-acknowledged long-term reference inter prediction mode which encodes the target image portion relative to a corresponding long-term reference in an unacknowledged frame or part of a frame stored in the decoded picture buffer; and performance of the rate-distortion optimization process in dependence on said feedback comprises determining a weighted estimate of distortion due to loss in dependence on an estimated probability of loss and a time since a last acknowledged earlier frame or acknowledged part of an earlier frame.

22. The computer program product of claim 21, wherein said feedback comprises one of an acknowledgement that at least part of said earlier frame has been received, and a report that at least part of said earlier frame has not been received, the report and the acknowledgement being determined at the decoder at the receiving terminal.

23. The computer program product of claim 22, wherein the code is configured such that the set of encoding modes includes an acknowledged reference inter prediction mode which encodes the target image portion relative to a corresponding reference portion in the acknowledged earlier frame or acknowledged part of the earlier frame, the acknowledged earlier frame being acknowledged by an acknowledgement corresponding to the earlier frame, the acknowledged part of the earlier frame being acknowledged by an acknowledgement corresponding to the at least part of the earlier frame.

24. The computer program product of claim 23, wherein the code is configured such that the acknowledged reference inter prediction mode is available for use in the encoding mode selection on condition that the reference portion is acknowledged as received and anything relative to which the reference portion was encoded has also been acknowledged as received, such that the reference portion is known to incur no error propagation.

25. The computer program product of claim 22, wherein the code is configured such that performance of the rate-distortion optimization process in dependence on said feedback comprises: setting the estimate of distortion due to loss to nothing on condition that the feedback comprising said acknowledgement is received.

26. The computer program product of claim 21, wherein the code is configured such that:
  the performance of the rate-distortion optimization process in dependence on said feedback comprises: adjusting the estimate of distortion for the earlier frame or part of the earlier frame in dependence on at least one of said acknowledgment and said report, and propagating the adjusted estimate of distortion forward for use in relation to the current frame.

27. The method of claim 1, wherein the dependence on feedback comprises, for at least one mode of the set of encoding modes, updating a probability based on a time calculation determined from the feedback and weighting at least part of the estimate of distortion that would be experienced due to possible loss over the channel with the updated probability.

28. The method of claim 1, wherein the performance of the rate-distortion optimization process in dependence on said feedback comprises: adjusting the estimate of distortion for the earlier frame or part of the earlier frame in dependence on said feedback, and propagating the adjusted estimate of distortion forward for use in relation to the current frame.

* * * * *